(12) United States Patent
Tamada

(10) Patent No.: US 11,542,874 B2
(45) Date of Patent: Jan. 3, 2023

(54) GAS TURBINE SYSTEM AND GAS TURBINE POWER GENERATOR

(71) Applicant: HONDA MOTOR CO., LTD., Tokyo (JP)

(72) Inventor: Shunichiro Tamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/499,895

(22) Filed: Oct. 13, 2021

(65) Prior Publication Data

US 2022/0120223 A1  Apr. 21, 2022

(30) Foreign Application Priority Data

Oct. 20, 2020 (JP) .............................. JP2020-175916
Oct. 20, 2020 (JP) .............................. JP2020-175917
Oct. 20, 2020 (JP) .............................. JP2020-175918

(51) Int. Cl.
*F02C 9/18* (2006.01)
*F02C 6/20* (2006.01)

(52) U.S. Cl.
CPC .............. *F02C 9/18* (2013.01); *F02C 6/206* (2013.01); *F05D 2240/35* (2013.01); *F05D 2270/053* (2013.01); *F05D 2270/335* (2013.01)

(58) Field of Classification Search
CPC ...... F02C 6/00; F02C 6/08; F02C 7/32; F02C 7/36; F02C 9/18
See application file for complete search history.

(56) References Cited

U.S. PATENT DOCUMENTS

| | | | |
|---|---|---|---|
| 6,499,303 B1 * | 12/2002 | Polukort | F01K 23/10 60/39.182 |
| 9,493,245 B2 | 11/2016 | Salyer | |
| 11,015,523 B2 * | 5/2021 | Terwilliger | B60L 50/10 |
| 2010/0146965 A1 * | 6/2010 | Easley, Jr. | F02B 37/013 60/602 |
| 2013/0111917 A1 * | 5/2013 | Ho | F02C 3/13 60/773 |

(Continued)

*Primary Examiner* — Todd E Manahan
*Assistant Examiner* — Thuyhang N Nguyen
(74) *Attorney, Agent, or Firm* — Amin, Turocy & Watson, LLP

(57) ABSTRACT

There are provided a gas turbine system and a gas turbine power generator that can achieve an increase in output power and a decrease in fuel efficiency together and curb an increase in cost and weight. There is also provided a gas turbine system that can stably supply a necessary amount of air to a combustor even when a compressor and a turbine on one side are stopped. The gas turbine system 1 includes a plurality of gas turbine units 2 and 3, a single combustor 4, a plurality of pipes 5, a plurality of on-off valves 6, and a control unit 7. In a first operation mode, the control unit 7 controls switching-on/off of the on-off valves 6 such that air is supplied to the combustor 4 from a first compressor 21 and a second compressor 31. In a second operation mode, the control unit 7 controls switching-on/off of the on-off valves 6 such that air compressed in stages while sequentially passing through the first compressor 21 and the second compressor 31 is supplied to the combustor 4, and supplies air to turbines such that they can be expanded in stages.

16 Claims, 10 Drawing Sheets

(56) References Cited

U.S. PATENT DOCUMENTS

| | | | |
|---|---|---|---|
| 2013/0213048 A1* | 8/2013 | Stucki | F02B 37/105 60/39.21 |
| 2016/0273397 A1* | 9/2016 | Ekanayake | F02C 6/08 |
| 2018/0016989 A1* | 1/2018 | Abe | F02C 7/36 |
| 2021/0054782 A1* | 2/2021 | Kupratis | F01D 13/003 |

* cited by examiner

GAS TURBINE SYSTEM AND GAS TURBINE POWER GENERATOR

CROSS-REFERENCE TO RELATED APPLICATIONS

Priority is claimed on Japanese Patent Application No. 2020-175916 filed Oct. 20, 2020, No. 2020-175917 filed Oct. 20, 2020, and No. 2020-175918 filed October 20, the content of all of which is incorporated herein by reference.

BACKGROUND OF THE INVENTION

Field of the Invention

The invention relates to a gas turbine system and a gas turbine power generator.

Description of Related Art

In the related art, a configuration of a gas turbine engine which is mounted in an airframe of an aircraft or the like and which serves as a power source for propelling the airframe is known. In such a gas turbine engine, for example, various techniques for obtaining high output power in a high-load state such as a takeoff/landing state of an aircraft have been proposed.

For example, Patent Document 1 (United States Patent Application, Publication No. 2013/0213048) discloses a configuration in which a plurality of compressors and a plurality of turbines are directly connected to a plurality of rotation shafts and compressed air from the plurality of compressors is supplied to a single combustor. According to the technique described in Patent Document 1, it is possible to obtain high output power in a high-load state such as a takeoff/landing state of an aircraft by supplying compressed air from the plurality of compressors to the single combustor.

In a gas turbine system which is mounted in an airframe of an aircraft according to the related art including a plurality of compressors and a plurality of turbines, various techniques of supplying compressed air from the plurality of compressors to a single combustor have been proposed.

For example, Patent Document 1 discloses a configuration of a compound engine including a first gas turbine unit that includes a first compressor and a turbine, a second gas turbine unit that includes a second compressor and a turbine, a single combustor that is supplied with compressed air from the first and second compressors, an on-off valve that is provided upstream from the first compressor, and a diesel engine that is connected to the second compressor and a gas turbine. In a low-output state, the combustor is switched to the diesel engine. According to the technique described in Patent Document 1, when the combustor is used, high output power can be achieved by supplying compressed air from the plurality of compressors to the single combustor.

In the related art, various techniques of a gas turbine power generator that connects a power generator to a plurality of compressors or turbines mounted in an airframe of an aircraft or the like and drives a plurality of propellers using electric power from the power generator have been proposed.

For example, Patent Document 2 (U.S. Pat. No. 9,493,245) discloses a configuration of a gas turbine power generator including a plurality of gas turbine engines, a battery that supplies electric power to an electric motor of propellers, and a power generator that generates electric power by operating the gas turbine engines. The electric motor operates with electric power generated from the gas turbine engine by operating one of the gas turbine engine and the battery. According to the technique described in Patent Document 2, since the electric motor is configured to selectively respond to the power generator or the battery, it is possible to cope with various situations such as failure of the gas turbine engine.

SUMMARY OF THE INVENTION

In the technique described in Patent Document 1, for example, unnecessary fuel consumption occurs in a low-load state such as an aircraft cruising. In order to solve this problem, in the technique described in Patent Document 1, occurrence of unnecessary fuel consumption can be curbed by switching to the diesel engine in a low-load state, and an increase in output power in a high-load state and a decrease in fuel efficiency in a low-load state can be achieved together.

However, in the technique described in Patent Document 1, since a diesel engine needs to be newly added, there is concern regarding an increase in cost and the weight of the gas turbine system as a whole.

Therefore, an objective of the invention is to provide a gas turbine system that can achieve an increase in output power and improvement in fuel efficiency together and curb an increase in cost and weight.

In a gas turbine system including a plurality of gas turbine units, one gas turbine unit may be stopped, for example, at the time of occurrence of a defect or idling.

However, in the technique described in Patent Document 1, when the operation of the second compressor not including an on-off valve upstream therefrom is stopped, air flows into the second compressor and thus there is concern that a necessary amount of compressed air will not be able to be supplied to the combustor.

Therefore, another objective of the invention is to provide a gas turbine system that includes a plurality of compressors and turbines and that can stably supply a necessary amount of air to a combustor even when a compressor and a turbine on one side are stopped.

In the technique described in Patent Document 2, since each of the plurality of gas turbine engines includes a combustor, there is concern regarding an increase in weight or cost of the gas turbine power generator as a whole. When the weight increases, there is concern regarding a decrease in fuel efficiency.

Therefore, another objective of the invention is to provide a gas turbine power generator that can achieve improvement in fuel efficiency while curbing an increase in weight and cost in comparison with the related art.

A gas turbine system and a gas turbine power generator according to the invention have the following configurations.

(1) A gas turbine system according to an aspect of the invention including: a first gas turbine unit including a first compressor and a first turbine that rotates integrally with the first compressor; a second gas turbine unit including a second compressor and a second turbine that rotates integrally with the second compressor; a single combustor that is connected to the first gas turbine unit and the second gas turbine unit; a first supply pipe that connects the first compressor to the combustor and allows air compressed by the first compressor to flow to an intake port of the combustor; a second supply pipe that connects the second compressor to the combustor and allows air compressed by the second compressor to flow to the intake port of the combustor; a compressor connection pipe that connects an outlet of the first compressor to an inlet of the second compressor; a first on-off valve that is provided in the first supply pipe and is able to cut off a flow of air in the first supply pipe; a second on-off valve that is provided upstream in a flow direction of air from the inlet of the second compressor and is able to cut off a flow of air to the second compressor; a third on-off valve that is provided in the compressor connection pipe and is able to cut off a flow of air in the compressor connection pipe; and a control unit configured to control switching-on/off of the first on-off valve, the second on-off valve, and the third on-off valve. The control unit is configured to switch an operation mode between a first operation mode which is set when required output power for the first gas turbine unit and the second gas turbine unit is equal to or greater than a predetermined value and a second operation mode which is set when the required output power is less than the predetermined value. The control unit opens the first on-off valve and the second on-off valve and closes the third on-off valve in the first operation mode. The control unit closes the first on-off valve and the second on-off valve and opens the third on-off valve in the second operation mode.

(2) In the gas turbine system according to the aspect of (1), the gas turbine system may be mounted in an aircraft, the first operation mode may be an operation mode which is used at the time of takeoff or landing of the aircraft, the second operation mode may be an operation mode which is used at the time of cruising of the aircraft, the combustor may be supplied with compressed air from the first compressor and the second compressor in the first operation mode, and the combustor may be supplied with compressed air which has a higher pressure than the compressed air in the first operation mode by compressing air in stages while sequentially passing through the first compressor and the second compressor in the second operation mode.

(3) In the gas turbine system according to the aspect of (1) or (2), the compressor connection pipe may be connected to a supply pipe mid-portion of the first supply pipe between the first compressor and the combustor and be formed integrally with the first supply pipe to communicate with the first supply pipe, and the first on-off valve and the third on-off valve may be a three-way valve which is provided in the supply pipe mid-portion.

(4) In the gas turbine system according to the aspect of any one of (1) to (3), the gas turbine system may further include: a first discharge pipe that connects the combustor to the first turbine and allows air discharged from the combustor to flow to the first turbine; a second discharge pipe that connects the combustor to the second turbine and allows air discharged from the combustor to flow to the second turbine; a turbine connection pipe that connects an inlet of the first turbine to an outlet of the second turbine; a fourth on-off valve that is provided in the first discharge pipe and is able to cut off a flow of air in the first discharge pipe; a fifth on-off valve that is provided downstream in a flow direction of air from the outlet of the second turbine and is able to cut off a flow of air from the second turbine to the outside; and a sixth on-off valve that is provided in the turbine connection pipe and is able to cut off a flow of air in the turbine connection pipe. The control unit may control switching-on/off of the fourth on-off valve, the fifth on-off valve, and the sixth on-off valve, the control unit may open the fourth on-off valve and the fifth on-off valve and close the sixth on-off valve in the first operation mode, and the control unit may close the fourth on-off valve and the fifth on-off valve and open the sixth on-off valve in the second operation mode.

(5) In the gas turbine system according to the aspect of (4), the turbine connection pipe may be connected to a discharge pipe mid-portion of the first discharge pipe between the first turbine and the combustor and be formed integrally with the first discharge pipe to communicate with the first discharge pipe, and the fourth on-off valve and the sixth on-off valve may be a three-way valve which is provided in the discharge pipe mid-portion.

(6) In the gas turbine system according to the aspect of any one of (1) to (5), the first gas turbine unit may include a first rotation shaft that connects the first compressor to the first turbine and a first power generator that is provided coaxially with the first rotation shaft between the first compressor and the first turbine. The second gas turbine unit may include a second rotation shaft that connects the second compressor to the second turbine and a second power generator that is provided coaxially with the second rotation shaft between the second compressor and the second turbine.

(3) A gas turbine system according to another aspect of the invention including: a first gas turbine unit including a first compressor and a first turbine that rotates integrally with the first compressor; a second gas turbine unit including a second compressor and a second turbine that rotates integrally with the second compressor; a single combustor that is connected to the first gas turbine unit and the second gas turbine unit; a first supply pipe that connects the first compressor to the combustor and allows air compressed by the first compressor to flow to an intake port of the combustor; a second supply pipe that connects the second compressor to the combustor and allows air compressed by the second compressor to flow to the intake port of the combustor; a compressor connection pipe that connects an outlet of the first compressor to an inlet of the second compressor; a first discharge pipe that connects the combustor to the first turbine and allows air discharged from the combustor to flow to the first turbine; a second discharge pipe that connects the combustor to the second turbine and allows air discharged from the combustor to flow to the second turbine; a turbine connection pipe that connects an inlet of the first turbine to an outlet of the second turbine; a first on-off valve that is provided in the first supply pipe and is able to cut off a flow of air in the first supply pipe; a second on-off valve that is provided upstream in a flow direction of air from the inlet of the second compressor and is able to cut off a flow of air to the second compressor; a third on-off valve that is provided in the compressor connection pipe and is able to cut off a flow of air in the compressor connection pipe; a fourth on-off valve that is provided in the first discharge pipe and is able to cut off a flow of air in the first discharge pipe; a fifth on-off valve that is provided downstream in a flow direction of air from the outlet of the second turbine and is able to cut off a flow of air from the second turbine to the outside; a sixth on-off valve that is provided in the turbine connection pipe and is able to cut off a flow of air in the turbine connection pipe; and a control unit configured to control switching-on/off of the first on-off valve, the second on-off valve, the third on-off valve, the fourth on-off valve, the fifth on-off valve, and the sixth on-off valve.

(8) In the gas turbine system according to the aspect of (7), the control unit may stop an operation of the first gas turbine unit and operate the second gas turbine unit by opening the second on-off valve and the fifth on-off valve and closing the first on-off valve, the third on-off valve, the fourth on-off valve, and the sixth on-off valve.

(9) In the gas turbine system according to the aspect of (7), the control unit may operate the first gas turbine unit and stop an operation of the second gas turbine unit by opening the first on-off valve and the fourth on-off valve and closing the second on-off valve, the third on-off valve, the fifth on-off valve, and the sixth on-off valve.

(10) In the gas turbine system according to the aspect of any one of (7) to (9), the first gas turbine unit may include a first rotation shaft that connects the first compressor to the first turbine and a first power generator that is provided coaxially with the first rotation shaft between the first compressor and the first turbine. The second gas turbine unit may include a second rotation shaft that connects the second compressor to the second turbine and a second power generator that is provided coaxially with the second rotation shaft between the second compressor and the second turbine.

(11) In the gas turbine system according to the aspect of any one of (7) to (10), the control unit may be able to switch an operation mode to: a first operation mode which is an operation mode in which both the first gas turbine unit and the second gas turbine unit operate and which is set when an output request for the first gas turbine unit and the second gas turbine unit is equal to or greater than a predetermined value; a second operation mode which is an operation mode in which both the first gas turbine unit and the second gas turbine unit operate and which is set when the output request is less than the predetermined value; or a third operation mode in which one of the first gas turbine unit and the second gas turbine unit operates and the other stops its operation. Output power values of the first gas turbine unit and the second gas turbine unit in the first operation mode may be a first output power value, a sum of the output power values of the first gas turbine unit and the second gas turbine unit in the second operation mode may be a second output power value, an output power value of an operating one of the first gas turbine unit and the second gas turbine unit in the third operation mode may be a third output power value, and the third output power value may be equal to the first output power value.

(12) A gas turbine power generator according to another aspect of the invention is mounted in an airframe of an aircraft with a hybrid propulsion system including a plurality of rotors which are connected to a power generator and which are driven with electric power generated by the power generator, the gas turbine power generator including: a first gas turbine unit including a first compressor and a first turbine that is connected to the first compressor via a first rotation shaft and rotates integrally with the first compressor; a second gas turbine unit including a second compressor and a second turbine that is connected to the second compressor via a second rotation shaft and rotates integrally with the second compressor; a single combustor that is connected to the first gas turbine unit and the second gas turbine unit; a first supply pipe that connects the first compressor to the combustor and allows air compressed by the first compressor to flow to an intake port of the combustor; a second supply pipe that connects the second compressor to the combustor and allows air compressed by the second compressor to flow to the intake port of the combustor; a first discharge pipe that connects the combustor to the first turbine and allows air discharged from the combustor to flow to the first turbine; and a second discharge pipe that connects the combustor to the second turbine and allows air discharged from the combustor to flow to the second turbine, wherein the first gas turbine unit includes a first power generator that is connected to the first rotation shaft and is provided between the first compressor and the first turbine in an axial direction of the first rotation shaft, and the second gas turbine unit includes a second power generator that is connected to the second rotation shaft and is provided between the second compressor and the second turbine in an axial direction of the second rotation shaft.

(13) In the gas turbine power generator according to the aspect of (12), the first power generator may be provided coaxially with the first rotation shaft, and the second power generator may be provided coaxially with the second rotation shaft.

(14) In the gas turbine power generator according to the aspect of (12) or (13), the gas turbine power generator may further include: a plurality of on-off valves; a flight state detecting unit configured to detect a flight state of the aircraft; and an output control unit configured to control switching-on/off of the plurality of on-off valves and to control an engine output power based on the flight state detected by the flight state detecting unit. The plurality of on-off valves may include: a first on-off valve that is provided in the first supply pipe and is able to cut off a flow of air in the first supply pipe; a second on-off valve that is provided in the second supply pipe and is able to cut off a flow of air in the second supply pipe; a third on-off valve that is provided in the first discharge pipe and is able to cut off a flow of air in the first discharge pipe; and a fourth on-off valve that is provided in the second discharge pipe and is able to cut off a flow of air in the second discharge pipe. The output control unit may be able to switch an output power mode of the aircraft between a first operation mode and a second operation mode in which an output power value is less than an output power value in the first operation mode based on the flight state. The output control unit may stop an operation of one of the first gas turbine unit and the second gas turbine unit and close the on-off valves provided in the supply pipe and the discharge pipe connected to the one gas turbine unit in the second operation mode.

(15) In the gas turbine power generator according to the aspect of any one of (12) to (14), n the first power generator may be disposed to be closer to the first compressor than the first turbine in the axial direction of the first rotation shaft, and the second power generator may be disposed to be closer to the second compressor than the second turbine in the axial direction of the second rotation shaft.

(16) In the gas turbine power generator according to the aspect of any one of (12) to (15), the combustor may be disposed between the first gas turbine unit and the second gas turbine unit in an arrangement direction of the first gas turbine unit and the second gas turbine unit.

According to the aspect of (1), the gas turbine system includes two gas turbine units and a single combustor. The control unit is able to switch the operation mode between the first operation mode which is set when the required output power is equal to or greater than the predetermined value and the second operation mode which is set when the required output power is less than the predetermined value. In the first operation mode corresponding to a high-load state, the control unit opens the first on-off valve and the second on-off valve and closes the third on-off valve. When the third on-off valve is closed, a flow of air in the compressor connection pipe from the first compressor to the second compressor is cut off. Accordingly, air compressed by the each compressors flows to the single combustor. As a result, since an amount of air flowing to the combustor increases, a high output power is obtained from the gas turbine system.

On the other hand, in the second operation mode corresponding to a low-load state, the control unit closes the first on-off valve and the second on-off valve and opens the third on-off valve. When the third on-off valve is open, air can flow in the compressor connection pipe and air compressed by the first compressor flows to the inlet of the second compressor. Air which has been further compressed by the second compressor after having been compressed by the first compressor is supplied to the combustor. The air compressed by the second compressor in the second operation mode has a higher pressure than the air supplied to the combustor in the first operation mode. Accordingly, in the second operation mode, since air of which the pressure has been increased by compressing the air in stages using a plurality of compressors is supplied to the combustor, it is possible to enhance energy efficiency by improving the engine cycle. As a result, it is possible to improve in fuel efficiency of the gas turbine system.

Since the operation modes can switch therebetween by opening or closing a plurality of on-off valves, it is not necessary to additionally provide a diesel engine for a low-load state unlike in the related art. Accordingly, it is possible to achieve an increase in output power and improvement in fuel efficiency together by facilitating switching between the first operation mode and the second operation mode and to curb an increase in cost or weight in comparison with that in the related art including a diesel engine. Since the operation mode can be switched by only controlling the opening/closing of the on-off valves, it is possible to simplify a configuration associated with switching of the operation mode in comparison with that in the related art in which a gas turbine engine and diesel engine switch therebetween.

Accordingly, it is possible to provide a gas turbine system that can achieve an increase in output power and improvement in fuel efficiency together and curb an increase in cost and weight.

According to the aspect of (2), particularly in a gas turbine system which is mounted in an aircraft, the first operation mode is used at the time of takeoff/landing of the aircraft at which a high output power is required. The second operation mode is used at the time of cruising of the aircraft in which an output power is lower than that at the time of takeoff/landing. In the second operation mode, air of which an amount is smaller than that in the first operation mode and a compression ratio is higher is supplied to the combustor by compressing the air in stages. Accordingly, it is possible to enhance energy efficiency while maintaining a required output power in the second operation mode. As a result, particularly when the gas turbine system is used as a drive source of the aircraft, it is possible to provide a gas turbine system that can easily switch the operation mode between a plurality of operation modes based on the magnitude of the output power and achieve an increase in output power and improvement in fuel efficiency together.

According to the aspect of (3), the compressor connection pipe and the first supply pipe are formed integrally, and the three-way valve which is provided in a connection portion between the compressor connection pipe and the first supply pipe (the supply pipe mid-portion) is used as both the first on-off valve and the third on-off valve. Accordingly, since the number of components decreases, it is possible to curb an increase in cost or weight.

According to the aspect of (4), the gas turbine system includes a plurality of pipes (the first discharge pipe, the second discharge pipe, and the turbine connection pipe) and a plurality of on-off valves (the fourth on-off valve, the fifth on-off valve, and the sixth on-off valve) on an exhaust side of the combustor. In the first operation mode, the control unit opens the fourth on-off valve and the fifth on-off valve and closes the sixth on-off valve. When the sixth on-off valve is closed, a flow of air in the turbine connection pipe from the second turbine to the first turbine is cut off. Accordingly, exhaust gas discharged from the combustor flows to the first turbine and the second turbine sequentially via the first discharge pipe and the second discharge pipe. Accordingly, it is possible to discharge exhaust gas from both the first turbine and the second turbine.

On the other hand, in the second operation mode, the control unit closes the fourth on-off valve and the fifth on-off valve and opens the sixth on-off valve. When the sixth on-off valve is open, air can flow in the turbine connection pipe, and the outlet of the second turbine and the inlet of the first turbine communicate. Exhaust gas of the combustor is discharged sequentially via the second turbine and the first turbine. Accordingly, it is possible to efficiently rotate the two turbines with a small amount of air. As a result, it is possible to enhance energy efficiency.

According to the aspect of (5), the turbine connection pipe and the first discharge pipe are formed integrally, and the three-way valve which is provided in a connection portion between the turbine connection pipe and the first discharge pipe (the discharge pipe mid-portion) is used as both the fourth on-off valve and the sixth on-off valve. Accordingly, since the number of components decreases, it is possible to further curb an increase in cost or weight.

According to the aspect of (6), the first power generator is provided coaxially with the first compressor and the first turbine and the second power generator is provided coaxially with the second compressor and the second turbine. Accordingly, it is possible to generate electric power by driving the first power generator through rotation of the first compressor and the first turbine of the first gas turbine unit. It is possible to generate electric power by driving the second power generator through rotation of the second compressor and the second turbine of the second gas turbine unit. Accordingly, it is possible to effectively generate electric power using the power generators in any operation mode of the first operation mode and the second operation mode.

According to the aspect of (7), the gas turbine system includes two gas turbine units and a single combustor that is connected to the gas turbine units. Accordingly, it is possible to cause air compressed by a plurality of compressors to flow to the single combustor. As a result, it is possible to increase an amount of air flowing to the combustor and a flow rate of air and to obtain a high output power. The gas turbine system includes pipes (the first supply pipe, the second supply pipe, the compressor connection pipe, the first discharge pipe, the second discharge pipe, and the turbine connection pipe) that connect two compressors and the combustor, connect the two compressors, connect two turbines and the combustor, and connect the two turbines and first to sixth on-off valves that are provided in the pipes. It is possible to determine the pipes in which air can flow by controlling switching-on/off of desired on-off valves. Accordingly, one gas turbine unit of the two gas turbine units can be connected to the combustor. As a result, even when one gas turbine unit is stopped, for example, at the time of occurrence of a defect or at the time of idling, it is possible to cause air to flow in only the gas turbine unit in operation and to stably operate the gas turbine unit in operation.

Accordingly, with the gas turbine system including a plurality of compressors and a plurality of turbines, it is possible to provide a gas turbine system that can stably supply a necessary amount of air to the combustor even when a certain compressor and a certain turbine are stopped.

According to the aspect of (8), when the operation of the first gas turbine unit is stopped, the control unit opens the second on-off valve and the fifth on-off valve and closes the first on-off valve, the third on-off valve, the fourth on-off valve, and the sixth on-off valve. Accordingly, it is possible to operate the second gas turbine unit while stopping the operation of the first gas turbine unit. At this time, since a flow of air between the first gas turbine unit and the combustor and a flow of air between the first gas turbine unit and the second gas turbine unit are cut off by the on-off valves, air flowing in the second gas turbine unit does not flow to the first gas turbine unit. Accordingly, it is possible to supply a stable amount of air from the second gas turbine unit to the combustor.

According to the aspect of (9), when the operation of the second gas turbine unit is stopped, the control unit opens the first on-off valve and the fourth on-off valve and closes the second on-off valve, the third on-off valve, the fifth on-off valve, and the sixth on-off valve. Accordingly, it is possible to operate the first gas turbine unit while stopping the operation of the second gas turbine unit. At this time, since a flow of air between the second gas turbine unit and the combustor and a flow of air between the first gas turbine unit and the second gas turbine unit are cut off by the on-off valves, air flowing in the first gas turbine unit does not flow to the second gas turbine unit. Accordingly, it is possible to supply a stable amount of air from the first gas turbine unit to the combustor.

According to the aspect of (10), the first gas turbine unit includes the first power generator and the second gas turbine unit includes the second power generator. The first power generator is provided coaxially with the first compressor and the first turbine and the second power generator is provided coaxially with the second compressor and the second turbine. Accordingly, it is possible to generate electric power by driving the first power generator through rotation of the first compressor and the first turbine of the first gas turbine unit. It is possible to generate electric power by driving the second power generator through rotation of the second compressor and the second turbine of the second gas turbine unit. Accordingly, it is possible to effectively generate electric power using the power generator connected to the gas turbine unit in operation even when one gas turbine unit is stopped.

According to the aspect of (11), the control unit can switch the operation mode between the first operation mode and the second operation mode in which both the first gas turbine unit and the second gas turbine unit operate and the third operation mode in which one of the first gas turbine unit and the second gas turbine unit operates and the other stops its operation. The operation mode in which both the first gas turbine unit and the second gas turbine unit operate can switch between the first operation mode in which an output power request is equal to or greater than the predetermined value and the second operation mode in which the output power request is less than the predetermined value. In this way, since a plurality of operation modes can switch therebetween according to the magnitude of the output power request or the number of gas turbine units which are used, it is possible to improve efficiency of the gas turbine system and safety at the time of occurrence of a defect. In the third operation mode, an output power value (the third output power value) of one in operation of the first gas turbine unit and the second gas turbine unit is set to be equal to the first output power value in the first operation mode. Accordingly, even when one gas turbine unit of the two gas turbine units stops its operation, it is possible to secure an output power which is sufficiently high such that the operation is not hindered. As a result, it is possible to stably operate the gas turbine system.

According to the aspect of (12), the gas turbine power generator includes the first gas turbine unit, the second gas turbine unit, and the single combustor. Since the plurality of gas turbine units are connected to the single combustor, it is possible to decrease the number of components in comparison with that in the related art in which a plurality of combustors are provided to correspond to a plurality of gas turbine units. Accordingly, it is possible to curb an increase in weight or cost of the gas turbine power generator as a whole. With a decrease in weight of the gas turbine power generator, it is possible to improve fuel efficiency without decreasing an output power in comparison with that in the related art.

The first power generator is provided between the first compressor and the first turbine in the axial direction of the first rotation shaft. The second power generator is provided between the second compressor and the second turbine in the axial direction of the second rotation shaft. In this way, by providing each power generator between the corresponding compressor and the corresponding turbine, it is possible to effectively use a space between the compressor and the turbine in the axial direction and to decrease an axial length of the corresponding gas turbine unit as a whole. Accordingly, it is possible to decrease the size of the gas turbine power generator and to improve a degree of freedom in layout at the time of mounting the gas turbine power generator in an airframe. It is also possible to decrease the weight of the gas turbine power generator through the decrease in size.

Accordingly, it is possible to provide a gas turbine power generator with improved fuel efficiency while curbing an increase in cost or weight in comparison with that in the related art.

According to the aspect of (13), the first power generator is provided coaxially with the first rotation shaft and the second power generator is provided coaxially with the second rotation shaft. Accordingly, it is possible to efficiently transmit a rotational force generated by the compressors and the turbines to the corresponding power generators. As a result, it is possible to enhance power generation efficiency of the gas turbine power generator.

According to the aspect of (14), the output control unit switches the output power mode of the aircraft between the first operation mode and the second operation mode based on the flight state detected by the flight state detecting unit. In the second operation mode, the output control unit stops the operation of one of the first gas turbine unit and the second gas turbine unit and cuts off a flow of air in the supply pipes and the discharge pipes connected to the stopped gas turbine unit. Accordingly, for example, in a low-load state such as cruising of the aircraft, it is possible to curb generation of excessive electric power by switching the operation mode to the second operation mode. On the other hand, in a high-load state such as takeoff/landing of the aircraft, it is possible to secure a high output power by switching the operation mode to the first operation mode.

Accordingly, it is possible to provide a gas turbine power generator that can achieve further improvement in fuel efficiency when it is applied to an aircraft in which an output power value varies greatly between the low-load state and the high-load state.

According to the aspect of (15), the first power generator is disposed close to the first compressor than the first turbine, and the second power generator is disposed closer to the second compressor than the second turbine. Accordingly, since the power generator can be disposed on the compressor side on which the temperature is lower than that of the turbine, it is possible to protect the power generator from heat. As a result, even when the power generator is disposed between the compressor and the turbine to decrease the axial length, it is possible to curb a decrease in output performance of the power generator due to a high temperature.

According to the aspect of (16), the combustor is disposed between the first gas turbine unit and the second gas turbine unit. Accordingly, it is possible to decrease lengths of a plurality of pipes for connection between the combustor and the gas turbine units. As a result, it is possible to curb an increase in weight of the pipes.

DETAILED DESCRIPTION OF THE INVENTION

Hereinafter, embodiments of the invention will be described with reference to the accompanying drawings.

First Embodiment (Gas Turbine System)

Figure 1:
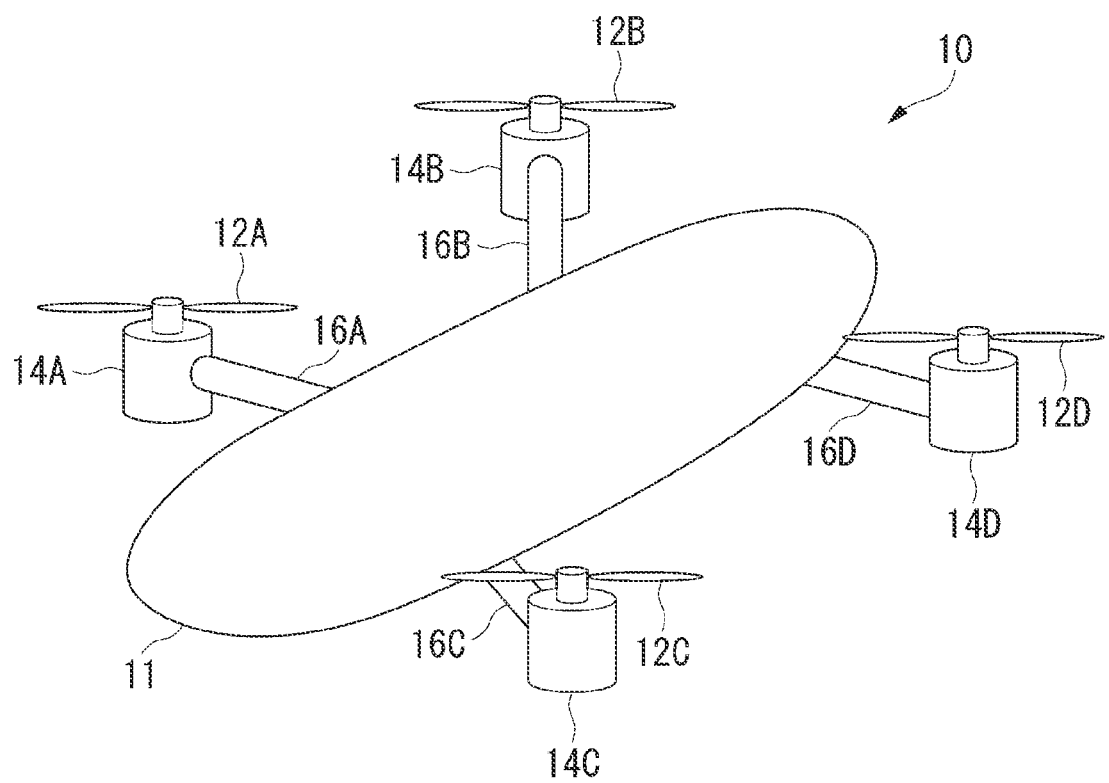
FIG. 1 is a diagram showing an appearance of an aircraft in which a gas turbine system according to a first embodiment is mounted.

FIG. 1 is a diagram showing an appearance of an aircraft 10 in which a gas turbine system according to a first embodiment is mounted. The aircraft 10 includes, for example, an airframe 11, a plurality of rotors 12A to 12D, a plurality of electric motors 14A to 14D, connection members 16A to 16D, and a gas turbine system 1. In the following description, the plurality of rotors 12A to 12D are referred to as rotors 12 when they are not distinguished, and the plurality of electric motors 14A to 14D are referred to as electric motors 14 when they are not distinguished.

The rotor 12A is connected to the airframe 11 via the connection member 16A. The electric motor 14A is attached to a base (a rotation shaft) of the rotor 12A. The electric motor 14A drives the rotor 12A. The electric motor 14A is, for example, a brushless DC motor. The rotor 12A is a fixed wing of a blade rotating around an axis which is parallel to the direction of gravity when the aircraft 10 takes a horizontal posture. The rotors 12B to 12D, the connection members 16B to 16D, and the electric motors 14B to 14D have the same functional configurations as described above and thus description thereof will be omitted.

By causing the rotor 12 to rotate in accordance with a control signal, the aircraft 10 flies in a desired flight state. The control signal is a signal for controlling the aircraft 10 based on an instruction at the time of an operator's operation or automatic operation. For example, the aircraft 10 flies by causing the rotor 12A and the rotor 12D to rotate in a first direction (for example, clockwise) and causing the rotor 12B and the rotor 12C to rotate in a second direction (for example, counterclockwise). In addition to the rotors 12, an auxiliary rotor for posture maintenance or horizontal propulsion which is not shown may be provided.

Figure 2:
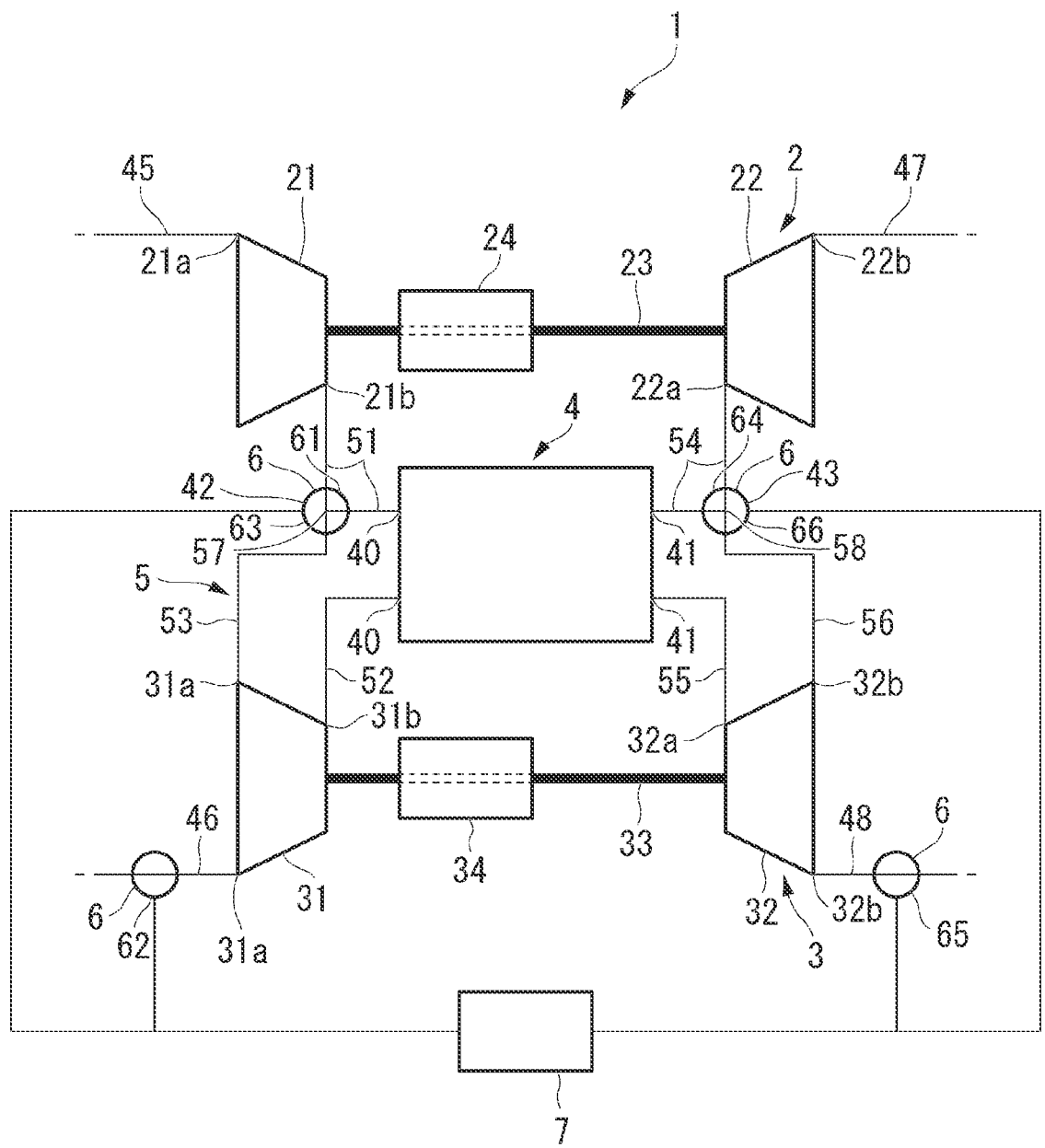
FIG. 2 is a diagram schematically showing a configuration of the gas turbine system according to the first embodiment.

FIG. 2 is a diagram schematically showing the configuration of the gas turbine system 1 according to this embodiment.

The gas turbine system 1 is mounted in the aircraft 10. The gas turbine system 1 generates electric power serving as a power source for driving the rotors 12A to 12D of the aircraft 10 (see FIG. 1). The gas turbine system 1 includes a so-called gas turbine engine. The gas turbine system 1 includes a first gas turbine unit 2, a second gas turbine unit 3, a single combustor 4, a plurality of pipes 5, a plurality of on-off valves 6, and a control unit 7.

(Gas Turbine Unit)

The first gas turbine unit 2 includes a first compressor 21, a first turbine 22, a first rotation shaft 23, and a first power generator 24. The first compressor 21 is a fan rotor blade that compresses intake air taken from vent holes (not shown) which are provided in the airframe 11 of the aircraft 10. The first turbine 22 is connected to the first compressor 21 and rotates integrally with the first compressor 21. The first rotation shaft 23 connects the first compressor 21 and the first turbine 22. The first rotation shaft 23 extends, for example, in a direction parallel to a longitudinal direction (a yaw axis) of the airframe 11. The first compressor 21 is connected to a front end of the first rotation shaft 23. The first turbine 22 is connected to a rear end of the first rotation shaft 23.

The first power generator 24 is disposed between the first compressor 21 and the first turbine 22. The first power generator 24 is provided coaxially with the first rotation shaft 23 and is connected to the first rotation shaft 23 via a reduction gear mechanism or the like. The first power generator 24 generates electric power (AC electric power) by driving the first turbine 22. The AC electric power generated by the first power generator 24 is converted to DC electric power by a converter of a power drive unit (PDU) which is not shown and is stored in a battery which is not shown. Electric power discharged from the battery is supplied to the electric motor 14 to drive the electric motor 14.

The second gas turbine unit 3 is provided, for example, in parallel to the first gas turbine unit 2 in a lateral direction of the airframe 11. The configuration of the second gas turbine unit 3 is the same as the configuration of the first gas turbine unit 2. That is, the second gas turbine unit 3 includes a second compressor 31, a second turbine 32, a second rotation shaft 33, and a second power generator 34. The second compressor 31 is a compressor that compresses air taken in via vent holes (not shown) formed in the airframe 11. The second turbine 32 is connected to the second compressor 31 and rotates integrally with the second compressor 31. The second rotation shaft 33 connects the second compressor 31 and the second turbine 32.

The second power generator 34 is disposed between the second compressor 31 and the second turbine 32. The second power generator 34 is provided coaxially with the second rotation shaft 33 and is connected to the second rotation shaft 33 via a reduction gear mechanism or the like. The second power generator 34 generates electric power (AC electric power) by driving the second turbine 32. The AC electric power generated by the second power generator 34 is converted to DC electric power by a converter of a power drive unit (PDU) which is not shown and is stored in a battery which is not shown. In this embodiment, the first power generator 24 and the second power generator 34 are connected to a common battery to store electric power, but a configuration in which the first power generator 24 and the second power generator 34 are connected to different batteries to store electric power in the individual batteries may be employed.

In the aircraft 10 according to this embodiment, the first gas turbine unit 2 has a power scale of about 100 kW and the second gas turbine unit 3 has a power scale of about 100 kW. The battery may have a battery management system (BMS) (not shown) that self-diagnoses a residual state of charge (SOC).

In the following description, portions of a compressor and a turbine which are located upstream in a flow direction of air and into which air is introduced may be referred to as "inlets 21a, 22a, 31a, and 32a" and portions of the compressor and the turbine which are located downstream in the flow direction of air and from which air is discharged may be referred to as "outlets 21b, 22b, 31b, and 32b."

(Combustor)

Regarding the combustor 4, a single combustor is provided for two gas turbine units (the first gas turbine unit 2 and the second gas turbine unit 3). The combustor 4 is disposed between the first gas turbine unit 2 and the second gas turbine unit 3 in the lateral direction of the airframe 11. The combustor 4 is located between the compressors 21 and 31 and the turbines 22 and 32 in the longitudinal direction of the airframe 11. More specifically, an intake port 40 of the combustor 4 is provided behind the outlet 21b of the first compressor 21 and the outlet 31b of the second compressor 31, and an exhaust port 41 of the combustor 4 is provided in front of the inlet 22a of the first turbine 22 and the inlet 32a of the second turbine 32. The combustor 4 is connected to the first gas turbine unit 2 and the second gas turbine unit 3. Compressed air from at least one of the first compressor 21 and the second compressor 31 flows to the combustor 4.

(Pipes)

The plurality of pipes 5 include a first supply pipe 51, a second supply pipe 52, a compressor connection pipe 53, a first discharge pipe 54, a second discharge pipe 55, and a turbine connection pipe 56. The first supply pipe 51 connects the outlet 21b of the first compressor 21 and the intake port 40 of the combustor 4. The first supply pipe 51 allows air compressed by the first compressor 21 to flow to the combustor 4. The second supply pipe 52 connects the outlet 31b of the second compressor 31 and the intake port 40 of the combustor 4. The second supply pipe 52 allows air compressed by the second compressor 31 to flow to the combustor 4. The first supply pipe 51 and the second supply pipe 52 are formed independently of each other such that air therein is not mixed.

The compressor connection pipe 53 connects the outlet 21b of the first compressor 21 and the inlet 31a of the second compressor 31. The compressor connection pipe 53 causes air compressed by the first compressor 21 to flow to the second compressor 31. Specifically, an upstream end of the compressor connection pipe 53 in the flow direction of air is connected to a supply pipe mid-portion 57 of the first supply pipe 51. The supply pipe mid-portion 57 is a portion of the first supply pipe 51 that is provided between the outlet 21b of the first compressor 21 and the combustor 4. The supply pipe mid-portion 57 is provided in a mid-portion in the longitudinal direction of the first supply pipe 51. A downstream end of the compressor connection pipe 53 in the flow direction of air is connected to the inlet 31a of the second compressor 31. In this embodiment, the compressor connection pipe 53 is formed integrally with the first supply pipe 51 to communicate with the first supply pipe 51. The compressor connection pipe 53 and the first supply pipe 51 are formed of, for example, a single pipe component that branches in a bifurcated shape at a position corresponding to the supply pipe mid-portion 57.

The first discharge pipe 54 connects the exhaust port 41 of the combustor 4 and the inlet 22a of the first turbine 22. The first discharge pipe 54 allows air discharged from the combustor 4 to flow to the first turbine 22. The second discharge pipe 55 connects the exhaust port 41 of the combustor 4 and the inlet 32a of the second turbine 32. The second discharge pipe 55 allows air discharged from the combustor 4 to flow to the second turbine 32. The first discharge pipe 54 and the second discharge pipe 55 are formed independently of each other such that air therein is not mixed.

The turbine connection pipe 56 connects the inlet 22a of the first turbine 22 and the outlet 32b of the second turbine 32. The turbine connection pipe 56 allows air discharge from the second turbine 32 to the first turbine 22. An upstream end of the turbine connection pipe 56 in the flow direction of air is connected to the outlet 32b of the second turbine 32. A downstream end of the turbine connection pipe 56 in the flow direction of air is connected to a discharge pipe mid-portion 58 of the first discharge pipe 54. The discharge pipe mid-portion 58 is a portion of the first discharge pipe 54 that is provided between the combustor 4 and the inlet 22a of the first turbine 22. The discharge pipe mid-portion 58 is disposed in a mid-portion in the longitudinal direction of the first discharge pipe 54. In this embodiment, the turbine connection pipe 56 is formed integrally with the first discharge pipe 54 to communicate with the first discharge pipe 54. The turbine connection pipe 56 and the first discharge pipe 54 are formed of, for example, a single pipe component that branches in a bifurcated shape at a position corresponding to the discharge pipe mid-portion 58.

The plurality of pipes 5 further include first and second outside air introduction pipes 45 and 46 and first and second exhaust gas discharge pipes 47 and 48. The first outside air introduction pipe 45 is connected to the inlet 21a of the first compressor 21. The first outside air introduction pipe 45 supplies outside air to the first compressor 21. The second outside air introduction pipe 46 is connected to the inlet 31a of the second compressor 31. The second outside air introduction pipe 46 supplies outside air to the second compressor 31. The first exhaust gas discharge pipe 47 is connected to the outlet 22b of the first turbine 22. The first exhaust gas discharge pipe 47 discharges air (gas) discharged from the first turbine 22 to the outside of the airframe 11. The second exhaust gas discharge pipe 48 is connected to the outlet 32b of the second turbine 32. The second exhaust gas discharge pipe 48 discharges air (gas) discharged from the second turbine 32 to the outside of the airframe 11.

The first and second outside air introduction pipes 45 and 46 or the first and second exhaust gas discharge pipes 47 and 48 may be omitted. That is, for example, any particular member may not be provided as long as spaces, passages, holes, or the like that can introduce outside air into the airframe 11 or discharge air from the inside to the outside of the airframe 11 are provided in the airframe 11.

(On-Off Valves)

The plurality of on-off valves 6 include a first on-off valve 61, a second on-off valve 62, a third on-off valve 63, a fourth on-off valve 64, a fifth on-off valve 65, and a sixth on-off valve 66. The first on-off valve 61 is provided in the first supply pipe 51 and is configured to switch a flow of air in the first supply pipe 51 between permission and prohibition. The second on-off valve 62 is provided upstream in the flow direction of air from the inlet 31a of the second compressor 31. The second on-off valve 62 is provided in the outside air introduction pipe 46 and is configured to switch a flow of air to the second compressor 31 between permission and prohibition. The third on-off valve 63 is provided in the compressor connection pipe 53 and is configured to switch a flow of air in the compressor connection pipe 53 between permission and prohibition. The on-off valves are, for example, electromagnetic valves that are opened or closed by switching supply of electric power on/off.

In this embodiment, the first on-off valve 61 and the third on-off valve 63 are a unified single component. Specifically, the first on-off valve 61 and the third on-off valve 63 are a three-way valve 42 that is provided in the supply pipe mid-portion 57. The three-way valve 42 is configured to switch between at least a first state and a second state which will be described below. The first state is a state in which the first compressor 21 and the combustor 4 communicate (corresponding to a state in which the first on-off valve 61 is open) and a flow of air from the first compressor 21 to the second compressor 31 is cut off (corresponding to a state in which the third on-off valve 63 is closed). The second state is a state in which a flow of air from the first compressor 21 to the combustor 4 is cut off (corresponding to a state in which the first on-off valve 61 is closed) and the first compressor 21 and the second compressor 31 communicate (corresponding to a state in which the third on-off valve 63 is open). In the following description, the operations of the three-way valve 42 may be simply described as an on/off operation of the first on-off valve 61 and the on/off operation of the third on-off valve 63.

The fourth on-off valve 64 is provided in the first discharge pipe 54 and is configured to switch a flow of air in the first discharge pipe 54 between permission and prohibition. The fifth on-off valve 65 is provided downstream in the flow direction of air from the outlet 32b of the second turbine 32. The fifth on-off valve 65 is provided in the second exhaust gas discharge pipe 48 and is configured to switch the flow of air from the second turbine 32 to the outside between permission and prohibition. The sixth on-off valve 66 is provided in the turbine connection pipe 56 and is configured to switch the flow of air in the turbine connection pipe 56 between permission and prohibition.

The fourth on-off valve 64 and the sixth on-off valve 66 are a unified single component. Specifically, the fourth on-off valve 64 and the sixth on-off valve 66 are a three-way valve 43 that is provided in the discharge pipe mid-portion 58. The three-way valve 43 is configured to switch between at least a first state and a second state which will be described below. The first state is a state in which the first turbine 22 and the combustor 4 communicate (corresponding to a state in which the fourth on-off valve 64 is open) and a flow of air from the second turbine 32 to the first turbine 22 is cut off (corresponding to a state in which the sixth on-off valve 66 is closed). The second state is a state in which a flow of air from the combustor 4 to the first turbine 22 is cut off (corresponding to a state in which the fourth on-off valve 64 is closed) and the first turbine 22 and the second turbine 32 communicate (corresponding to a state in which the sixth on-off valve 66 is open). In the following description, the operations of the three-way valve 43 may be simply described as an on/off operation of the fourth on-off valve 64 and the on/off operation of the sixth on-off valve 66.

(Control Unit)

The control unit 7 controls on/off operations of the intake-side three-way valve 42 (the first on-off valve 61 and the third on-off valve 63), the second on-off valve 62, the exhaust-side three-way valve 43 (the fourth on-off valve 64 and the sixth on-off valve 65), and the fifth on-off valve 65. The control unit 7 transmits a signal to the on-off valves, for example, using an electrical method. The plurality of on-off valves 6 switch between an open state and a closed state in accordance with the received signal. The control unit 7 identifies a predetermined operation mode of the aircraft 10 based on state information of the aircraft 10 or operation information from a pilot and turns the on-off valves on/off in a predetermined combination according to the identified type of the operation mode.

Figure 3:
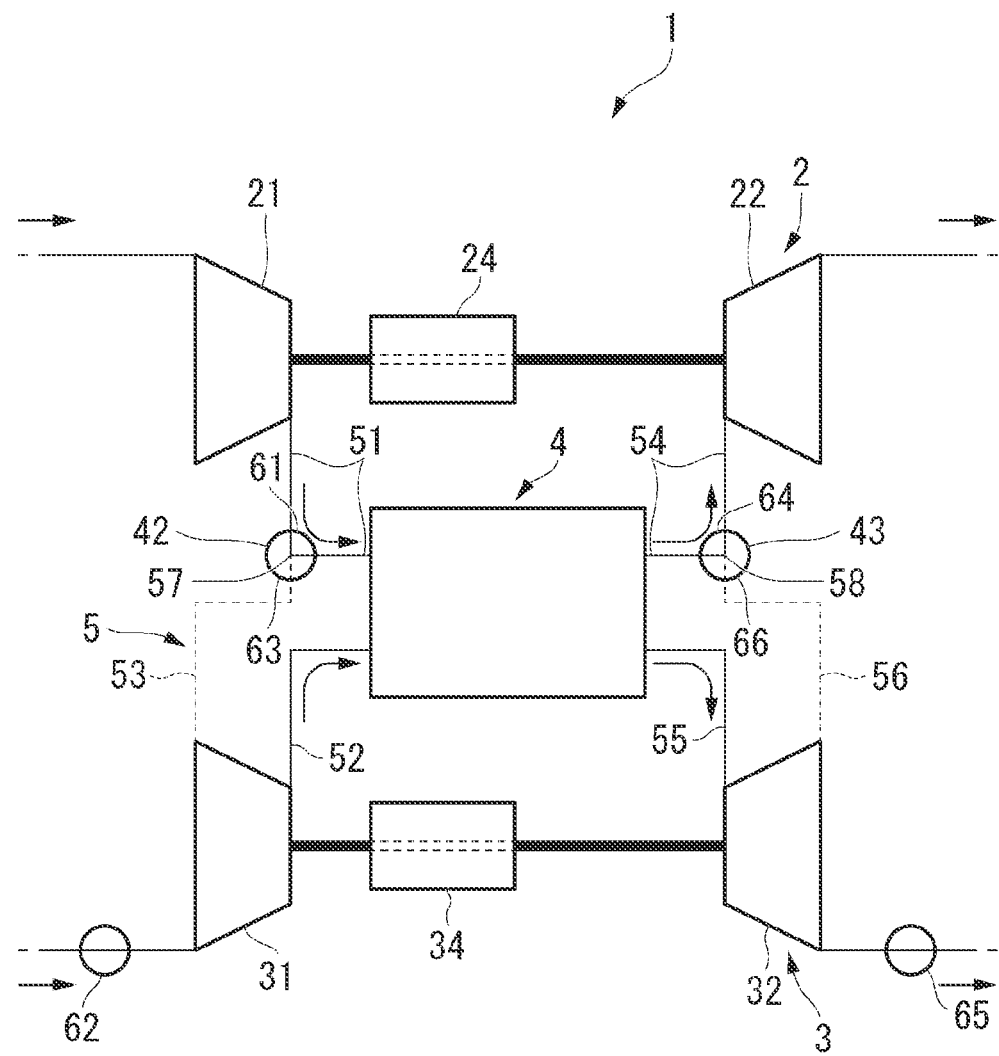
FIG. 3 is a diagram showing an operation of the gas turbine system in a first operation mode according to the first embodiment.
Figure 4:
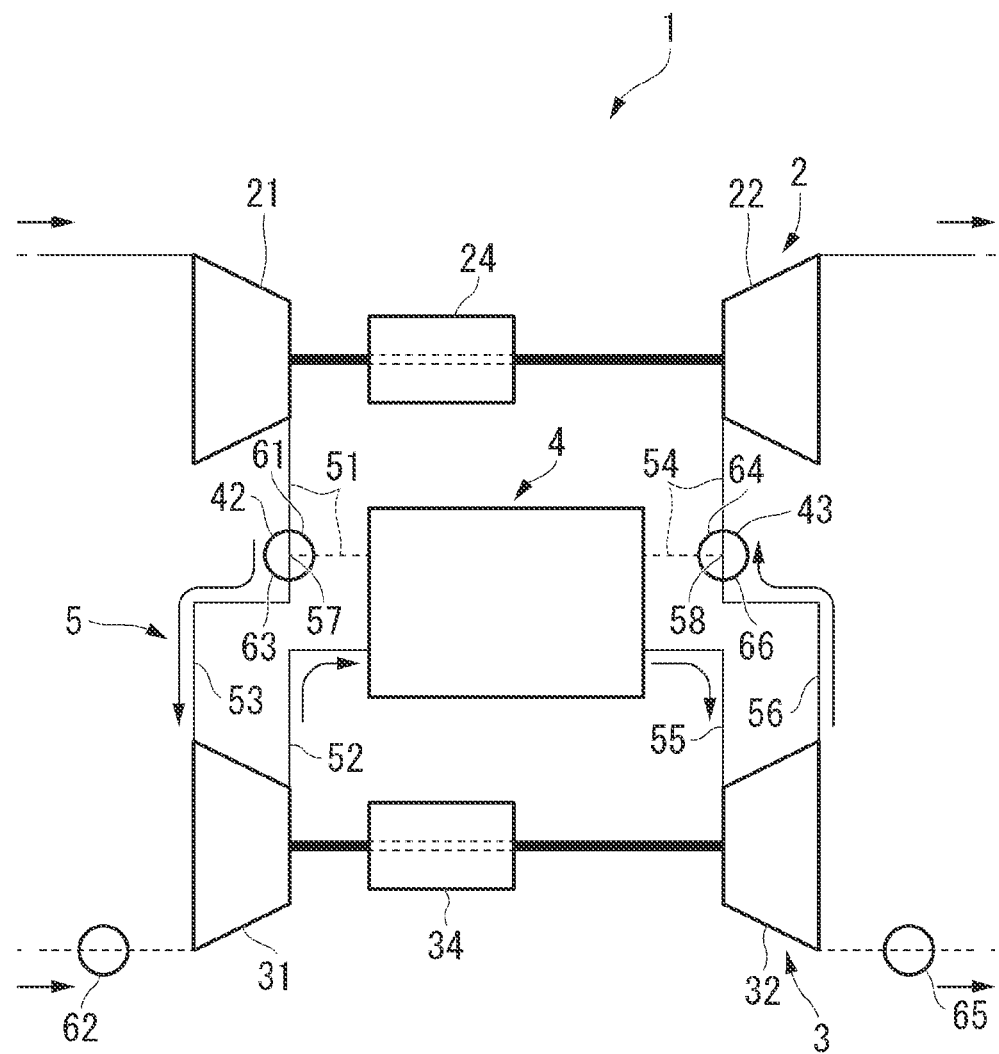
FIG. 4 is a diagram showing the operation of the gas turbine system in a second operation mode according to the first embodiment.

FIG. 3 is a diagram showing the operations of the gas turbine system 1 in a first operation mode M1 according to this embodiment. FIG. 4 is a diagram showing the operations of the gas turbine system 1 in a second operation mode M2 according to this embodiment. In FIGS. 3 and 4, the control unit 7 is not shown.

Figure 5:
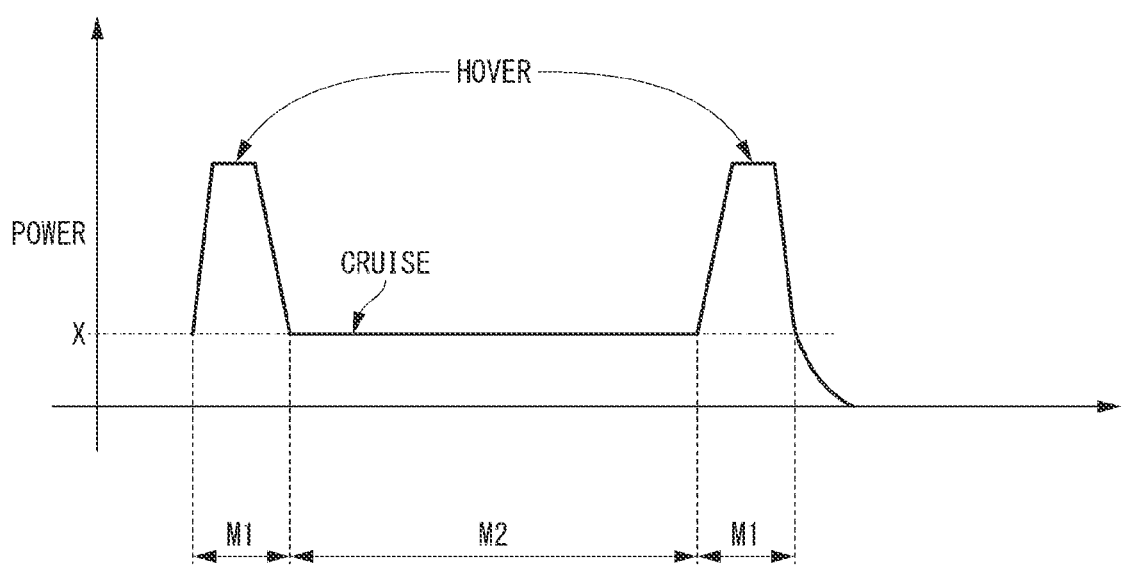
FIG. 5 is a graph showing a relationship between a required output power and an operation mode in an aircraft according to the first embodiment.

The control unit 7 can identify at least two operation modes including the first operation mode M1 (see FIGS. 3 and 5) and the second operation mode M2 (see FIGS. 4 and 5).

FIG. 5 is a graph showing a relationship between a required output power and an operation mode of the aircraft 10 according to this embodiment. In the graph shown in FIG. 5, the horizontal axis represents the operation mode and the vertical axis represents the required output power.

As shown in FIG. 5, the aircraft 10 taxies or hovers and takes off, ascends, accelerates, and cruises. The aircraft 10 descends, decelerates, hovers, and lands. A state in which the aircraft 10 is moving in a direction including a horizontal direction after having arrived at a predetermined height is a cruising state. In the following description, a cruising state is defined as a state in which the aircraft 10 is ascending and accelerating or is descending and decelerating. A state in which the aircraft 10 is performing a takeoff operation or a landing operation is referred to as a takeoff/landing state.

In these flight states, a required output power when the aircraft 10 is in the takeoff/landing state is higher than a required output power when the aircraft 10 is in the cruising state. The required output power is electric power which is required to cause the aircraft 10 to transition to a flight state corresponding to a control signal or to maintain a current flight state. A control device (not shown) of the aircraft 10 supplies the required output power to the electric motors 14, and controls the aircraft 10 in the flight state corresponding to the control signal by causing the electric motors 14 to drive the rotors 12 based on the required output power.

The control unit 7 that controls the on/off operations of the plurality of on-off valves 6 transitions to the first operation mode M1 when the aircraft 10 is in the takeoff/landing state. The control unit 7 transitions to the second operation mode M2 when the aircraft 10 is in the cruising state. In other words, the first operation mode M1 is an operation mode which is used when the aircraft 10 takes off or lands, and the second operation mode M2 is an operation mode which is used when the aircraft 10 cruises. The first operation mode M1 is an operation mode which is set when the required output power of the first gas turbine unit 2 and the second gas turbine unit 3 is equal to or greater than a predetermined value X. The second operation mode M2 is an operation mode which is set when the required output power is less than the predetermined value X.

(Operations of Gas Turbine System in Operation Modes)

The operations of the gas turbine system 1 in the operation modes will be described below. The operation of the gas turbine system 1 in the first operation mode M1 will be described first.

As shown in FIG. 3, in the first operation mode M1, the control unit 7 opens the first on-off valve 61 and the second on-off valve 62 and closes the third on-off valve 63. That is, the intake-side three-way valve 42 permits a flow of air from the first compressor 21 to the combustor 4 and cuts off a flow of air from the first compressor 21 to the second compressor 31. In the first operation mode M1, the control unit 7 opens the fourth on-off valve 64 and the fifth on-off valve 65 and closes the sixth on-off valve 66. That is, the exhaust-side three-way valve 43 permits a flow of air from the combustor 4 to the first turbine 22 and cuts off a flow of air from the second turbine 32 to the first turbine 22.

The first compressor 21 takes in and compresses outside air. The air compressed by the first compressor 21 flows to the combustor 4 via the first supply pipe 51. The second compressor 31 takes in and compresses outside air. The air compressed by the second compressor 31 flows to the combustor 4 via the second supply pipe 52. Accordingly, since compressed air flows to the combustor 4 from the first compressor 21 and the second compressor 31, the combustor 4 is supplied with an amount of air sufficient for generating an output power required for the combustor 4.

About half of air discharged from the combustor 4 is supplied to the first turbine 22 via the first discharge pipe 54 and rotates the first turbine 22. Thereafter, air is discharged from the first turbine 22 to the outside. The other half of the air discharged from the combustor 4 is supplied to the second turbine 32 via the second discharge pipe 55 and rotates the second turbine 32. Thereafter, air is discharged from the second turbine 32 to the outside.

Next, the operation of the gas turbine system 1 in the second operation mode M2 will be described. As shown in FIG. 4, in the second operation mode M2, the control unit 7 closes the first on-off valve 61 and the second on-off valve 62 and opens the third on-off valve 63. That is, the intake-side three-way valve 42 cuts off a flow of air from the first compressor 21 to the combustor 4 and permits the flow of air from the first compressor 21 to the second compressor 31. In the second operation mode M2, the control unit 7 closes the fourth on-off valve 64 and the fifth on-off valve 65 and opens the sixth on-off valve 66. That is, the exhaust-side three-way valve 43 cuts off the flow of air from the combustor 4 to the first turbine 22 and permits the flow of air from the second turbine 32 to the first turbine 22.

The first compressor 21 takes in and compresses outside air. The air compressed by the first compressor 21 flows to the second compressor 31 via the compressor connection pipe 53. Since the second on-off valve 62 is closed, only the compressed air from the first compressor 21 is supplied to the second compressor 31. The second compressor 31 further compresses the compressed air from the first compressor 21. The air compressed at a higher compression ratio than that in the second compressor 31 flows to the combustor 4 via the second supply pipe 52. In this way, since air is compressed in stages while sequentially passing through the first compressor 21 and the second compressor 31, compressed air with a higher pressure than the compressed air in the first operation mode M1 is supplied to the combustor 4.

Air discharged from the combustor 4 is supplied to the second turbine 32 via the second discharge pipe 55 and rotates the second turbine 32. Air discharged from the outlet 32b of the second turbine 32 is supplied to the inlet 22a of the first turbine 22 via the turbine connection pipe 56 and rotates the first turbine 22. Thereafter, the air is discharged from the first turbine 22 to the outside.

(Operations and Advantages)

The operations and advantages of the gas turbine system 1 will be described below.

The gas turbine system 1 according to this embodiment includes two gas turbine units 2 and 3 and a single combustor 4. The control unit 7 is able to switch the operation mode between the first operation mode M1 which is set when the required output power is equal to or greater than the predetermined value X and the second operation mode M2 which is set when the required output power is less than the predetermined value X. In the first operation mode M1 corresponding to a high-load state, the control unit 7 opens the first on-off valve 61 and the second on-off valve 62 and closes the third on-off valve 63. When the third on-off valve 63 is closed, a flow of air in the compressor connection pipe 53 from the first compressor 21 to the second compressor 31 is cut off. Accordingly, air compressed by the each compressors 21 and 31 flows to the single combustor 4. As a result, since an amount of air flowing to the combustor 4 increases, a high output power is obtained from the gas turbine system 1.

On the other hand, in the second operation mode M2 corresponding to a low-load state, the control unit 7 closes the first on-off valve 61 and the second on-off valve 62 and opens the third on-off valve 63. When the third on-off valve 63 is open, air can flow in the compressor connection pipe 53 and air compressed by the first compressor 21 flows to the inlet 31a of the second compressor 31. Air which has been further compressed by the second compressor 31 after having been compressed by the first compressor 21 is supplied to the combustor 4. The air compressed by the second compressor 31 in the second operation mode M2 has a higher pressure than the air supplied to the combustor 4 in the first operation mode M1. Accordingly, in the second operation mode M2, since air of which the pressure has been increased by compressing the air in stages using a plurality of compressors is supplied to the combustor 4, it is possible to enhance energy efficiency by improving the engine cycle. As a result, it is possible to improve in fuel efficiency of the gas turbine system 1.

Since the operation modes can be switched by opening or closing a plurality of on-off valves 6, it is not necessary to additionally provide a diesel engine for a low-load state as in in the related art. Accordingly, it is possible to achieve an increase in output power and improvement in fuel efficiency together by facilitating switching between the first operation mode M1 and the second operation mode M2 and to curb an increase in cost or weight in comparison with that in the related art including a diesel engine. Since the operation mode can be switched by only controlling opening/closing of the on-off valves 6, it is possible to simplify a configuration associated with switching of the operation mode in comparison with that in the related art in which a gas turbine engine and diesel engine switch therebetween.

Accordingly, it is possible to provide a gas turbine system 1 that can achieve an increase in output power and improvement in fuel efficiency together and curb an increase in cost and weight.

The gas turbine system 1 is mounted in an aircraft 10. Particularly in a gas turbine system 1 which is mounted in the aircraft 10, the first operation mode M1 is used at the time of takeoff/landing of the aircraft 10 at which a high output power is required. The second operation mode M2 is used at the time of cruising of the aircraft 10 at which an output power is lower than that at the time of takeoff/landing. In the second operation mode M2, air of which an amount is smaller and a compression ratio is higher than that in the first operation mode M1 is supplied to the combustor 4 by compressing the air in stages. Accordingly, it is possible to enhance energy efficiency while maintaining a required output power in the second operation mode M2. As a result, particularly when the gas turbine system 1 is used as a drive source of the aircraft 10, it is possible to provide a gas turbine system 1 that can easily switch the operation mode between a plurality of operation modes based on the magnitude of the output power and achieve an increase in output power and improvement in fuel efficiency together.

The compressor connection pipe 53 and the first supply pipe 51 are integrally formed, and the first on-off valve 61 and the third on-off valve 63 are the three-way valve 42 provided in the supply pipe mid-portion 57. Accordingly, the compressor connection pipe 53 and the first supply pipe 51 are formed integrally, and the three-way valve 42 provided in a connection portion between the compressor connection pipe 53 and the first supply pipe 51 (the supply pipe mid-portion 57) is used as both the first on-off valve 61 and the third on-off valve 63. Accordingly, since the number of components decreases, it is possible to curb an increase in cost or weight.

The gas turbine system 1 includes a plurality of pipes 5 (the first discharge pipe 54, the second discharge pipe 55, and the turbine connection pipe 56) and a plurality of on-off valves 6 (the fourth on-off valve 64, the fifth on-off valve 65, and the sixth on-off valve 66) on an exhaust side of the combustor 4. In the first operation mode M1, the control unit 7 opens the fourth on-off valve 64 and the fifth on-off valve 65 and closes the sixth on-off valve 66. When the sixth on-off valve 66 is closed, a flow of air in the turbine connection pipe 56 from the second turbine 32 to the first turbine 22 is cut off. Accordingly, exhaust gas discharged from the combustor 4 flows to the first turbine 22 and the second turbine 32 sequentially via the first discharge pipe 54 and the second discharge pipe 55. Accordingly, it is possible to discharge exhaust gas from both the first turbine 22 and the second turbine 32.

On the other hand, in the second operation mode M2, the control unit 7 closes the fourth on-off valve 64 and the fifth on-off valve 65 and opens the sixth on-off valve 66. When the sixth on-off valve 66 is open, air can flow in the turbine connection pipe 56, and the outlet 32b of the second turbine 32 and the inlet 22a of the first turbine 22 communicate. Exhaust gas of the combustor 4 is discharged sequentially via the second turbine 32 and the first turbine 22. Accordingly, it is possible to efficiently rotate the two turbines with a small amount of air. As a result, it is possible to enhance energy efficiency.

The turbine connection pipe 56 and the first discharge pipe 54 are formed integrally, and the fourth on-off valve 64 and the sixth on-off valve 66 are the three-way valve 43 provided in the discharge pipe mid-portion 58. Accordingly, the turbine connection pipe 56 and the first discharge pipe 54 are formed integrally, and the three-way valve 43 provided in a connection portion between the turbine connection pipe 56 and the first discharge pipe 54 (the discharge pipe mid-portion 58) is used as both the fourth on-off valve 64 and the sixth on-off valve 66. Accordingly, since the number of components decreases, it is possible to further curb an increase in cost or weight.

The first gas turbine unit 2 includes the first power generator 24, and the second gas turbine unit 3 includes the second power generator 34. The first power generator 24 is provided coaxially with the first compressor 21 and the first turbine 22 and the second power generator 34 is provided coaxially with the second compressor 31 and the second turbine 32. Accordingly, it is possible to generate electric power by driving the first power generator 24 through rotation of the first compressor 21 and the first turbine 22 of the first gas turbine unit 2. It is possible to generate electric power by driving the second power generator 34 through rotation of the second compressor 31 and the second turbine 32 of the second gas turbine unit 3. Accordingly, it is possible to effectively generate electric power using the power generators in any operation mode of the first operation mode M1 and the second operation mode M2.

Second Embodiment

Figure 6:
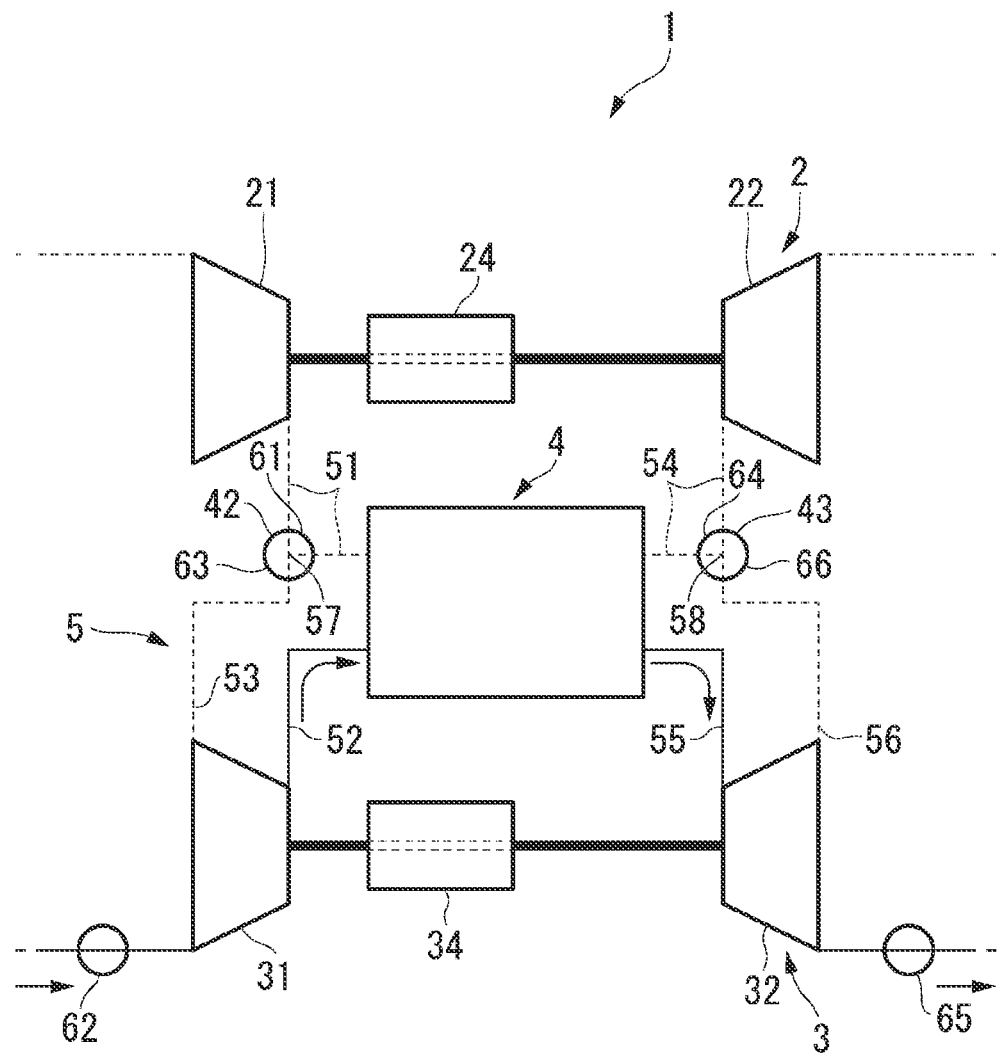
FIG. 6 is a diagram showing an operation of a gas turbine system when a first gas turbine unit is stopped in a third operation mode according to a second embodiment.
Figure 7:
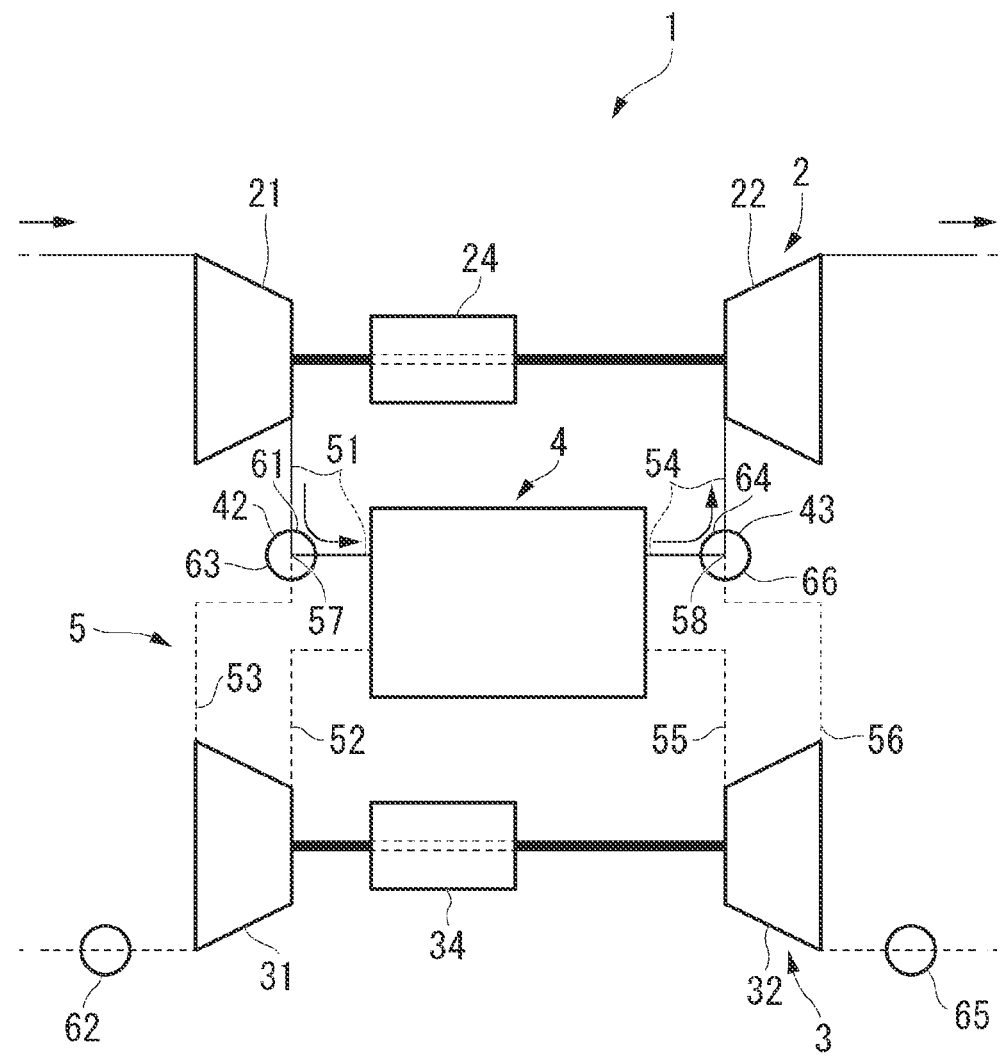
FIG. 7 is a diagram showing an operation of a gas turbine system when a second gas turbine unit is stopped in the third operation mode according to the second embodiment.

A second embodiment of the invention will be described below. FIG. 6 is a diagram showing an operation of a gas turbine system 1 when the first gas turbine unit 2 is stopped in a third operation mode M3 according to this embodiment (a first type of third operation mode M3-1 which will be described later). FIG. 7 is a diagram showing an operation of the gas turbine system 1 when the second gas turbine unit 3 is stopped in the third operation mode M3 according to this second embodiment (a second type of third operation mode M3-2 which will be described later). In the following description, the same elements as in the first embodiment will be referred to by the same reference signs and description thereof will be appropriately omitted. The second embodiment is different from the first embodiment in that the control unit 7 can further set a third operation mode M3.

Figure 8:
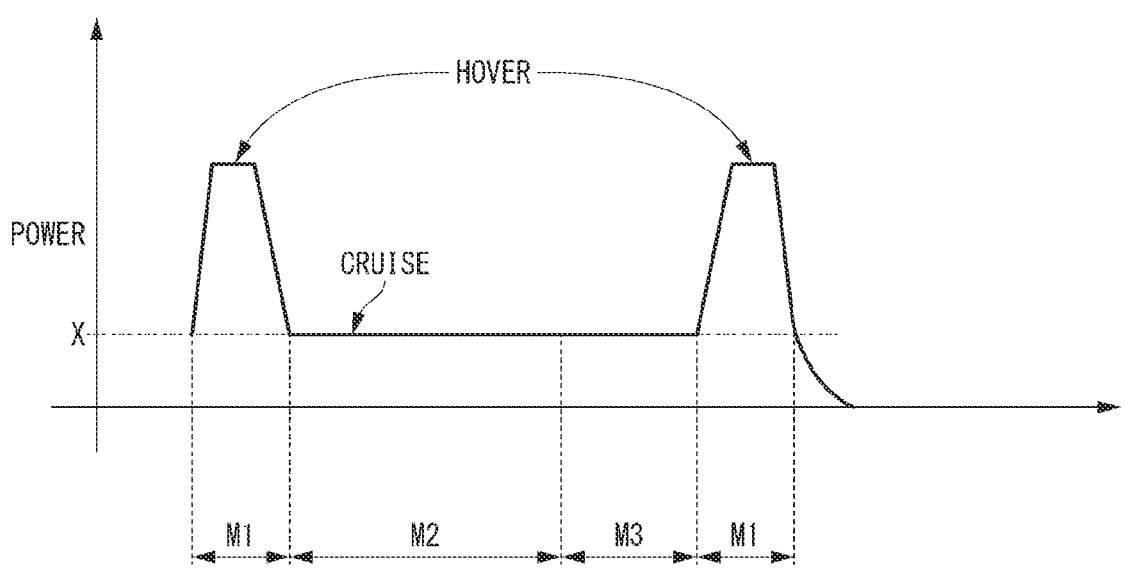
FIG. 8 is a graph showing a relationship between a required output power and an operation mode in an aircraft according to the second embodiment.

The control unit 7 can identify at least three operation modes including the first operation mode M1 (see FIGS. 3 and 8), the second operation mode M2 (see FIGS. 4 and 8), and the third operation mode M3 (see FIGS. 6, 7, and 8).

FIG. 8 is a graph showing a relationship between a required output power and an operation mode of the aircraft 10 according to this embodiment. In the graph shown in FIG. 8, the horizontal axis represents the operation mode and the vertical axis represents the required output power.

As shown in FIG. 8, similarly to the first embodiment, the aircraft 10 taxies or hovers and takes off, ascends, and accelerates, and cruises. The aircraft 10 descends, decelerates, hovers, and lands.

In these flight states, a required output power when the aircraft 10 is in the takeoff/landing state is higher than a required output power when the aircraft 10 is in the cruising state. The required output power is electric power which is required to cause the aircraft 10 to transition to a flight state corresponding to a control signal or to maintain a current flight state. A control device (not shown) of the aircraft 10 supplies the required output power to the electric motors 14, and controls the aircraft 10 in the flight state corresponding to the control signal by causing the electric motors 14 to drive the rotors 12 based on the required output power.

The control unit 7 that controls the on/off operations of the plurality of on-off valves 6 transitions to the first operation mode M1 when the aircraft 10 is in the takeoff/landing state. The control unit 7 transitions to the second operation mode M2 when the aircraft 10 is in the cruising state. In other words, the first operation mode M1 is an operation mode which is used when the aircraft 10 takes off or lands, and the second operation mode M2 is an operation mode which is used when the aircraft 10 cruises. The operations in the first operation mode M1 and the second operation mode M2 are the same as the operations in the first operation mode M1 and the second operation mode M2 in the first embodiment and thus detailed description thereof will be omitted in the following description. The first operation mode M1 is an operation mode in which both the first gas turbine unit 2 and the second gas turbine unit 3 operate and which is set when the required output power of the first gas turbine unit 2 and the second gas turbine unit 3 is equal to or greater than a predetermined value X. The second operation mode M2 is an operation mode in which both the first gas turbine unit 2 and the second gas turbine unit 3 operate and which is set when the required output power is less than the predetermined value X.

In the second embodiment, the control unit 7 switches the operation mode to the third operation mode M3 when the aircraft 10 is in the cruising state and one of the two gas turbine units 2 and 3 needs to be stopped for a certain reason. The third operation mode M3 is an operation mode in which one of the first gas turbine unit 2 and the second gas turbine unit 3 operates and the other stops its operation. More specifically, the third operation mode M3 includes a first type of third operation mode M3-1 in which the second gas turbine unit 3 operates and the first gas turbine unit 2 stops its operation (see FIG. 6) and a second type of third operation mode M3-2 in which the first gas turbine unit 2 operates and the second gas turbine unit 3 stops its operation (see FIG. 7). In the following description, the first type of third operation mode M3-1 and the second type of third operation mode M3-2 may be simply referred to as the third operation mode M3 when they are not distinguished.

Output power values of the first gas turbine unit 2 and the second gas turbine unit 3 in the first operation mode M1 are a first output power value. The first output power value is, for example, 100 kW. Accordingly, in this embodiment, the output power value of the gas turbine system 1 as a whole in the first operation mode M1 is 200 kW.

The sum of the output power values of the first gas turbine unit 2 and the second gas turbine unit 3 in the second operation mode M2 is a second output power value. The second output power value is, for example, 100 kW. In other words, the output power values of the first gas turbine unit 2 and the second gas turbine unit 3 in the second operation mode M2 are 50 kW respectively. Accordingly, in this embodiment, the output power value of the gas turbine system 1 as a whole in the second operation mode M2 is 100 kW.

The output power value of the gas turbine unit in operation out of the first gas turbine unit 2 and the second gas turbine unit 3 in the third operation mode M3 is a third output power value. The third output power value is equal to the first output power value in the first operation mode M1. The third output power value is, for example, 100 kW. Accordingly, in this embodiment, the output power value of the gas turbine system 1 as a whole in the third operation mode M3 is 100 kW.

The operation of the gas turbine system 1 in the first type of third operation mode M3-1 will be described below.

As shown in FIG. 6, in the first type of third operation mode M3-1, the control unit 7 opens the second on-off valve 62 and the fifth on-off valve 65 and closes the first on-off valve 61, the third on-off valve 63, the fourth on-off valve 64, and the sixth on-off valve 66. That is, the intake-side three-way valve 42 cuts off a flow of air from the second compressor 31 to the first compressor 21. Preferably, the intake-side three-way valve 42 cuts off a flow of air between the first compressor 21 and the combustor 4. The exhaust-side three-way valve 43 cuts off a flow of air from the second turbine 32 to the first turbine 22. Preferably, the exhaust-side three-way valve 43 cuts off a flow of air between the combustor 4 and the first turbine 22. Accordingly, the control unit 7 stops the operation of the first gas turbine unit 2 and activates the second gas turbine unit 3. The control unit 7 may perform on/off control of the on-off valves 6 after rotation of the first gas turbine unit 2 has been completely stopped.

The second compressor 31 takes in and compresses outside air. The air compressed by the second compressor 31 flows to the combustor 4 via the second supply pipe 52. In the first type of third operation mode M3-1, a compression ratio of air supplied from the second compressor 31 to the combustor 4 is equal to a compression ratio of air supplied from the second compressor 31 to the combustor 4 in the first operation mode M1. Accordingly, the same output power as the output power of the second gas turbine unit 3 in the first operation mode M1 is acquired in the second gas turbine unit 3 in the first type of third operation mode M3-1.

Air discharged from the combustor 4 is supplied to the second turbine 32 via the second discharge pipe 55 and rotates the second turbine 32. Thereafter, the air is discharged from the second turbine 32 to the outside.

The operation of the gas turbine system 1 in the second type of third operation mode M3-2 will be described below.

As shown in FIG. 7, in the second type of third operation mode M3-2, the control unit 7 opens the first on-off valve 61 and the fourth on-off valve 64 and closes the second on-off valve 62, the third on-off valve 63, the fifth on-off valve 65, and the sixth on-off valve 66. That is, the intake-side three-way valve 42 permits a flow of air from the first compressor 21 to the combustor 4 and cuts off a flow of air between the first compressor 21 and the second compressor 31. The exhaust-side three-way valve 43 permits a flow of air from the combustor 4 to the first turbine 22 and cuts off a flow of air from the first turbine 22 to the second turbine 32. Accordingly, the control unit 7 stops the operation of the second gas turbine unit 3 and activates the first gas turbine unit 2. The control unit 7 may perform on/off control of the on-off valves 6 after rotation of the second gas turbine unit 3 has been completely stopped.

The first compressor 21 takes in and compresses outside air. The air compressed by the first compressor 21 flows to the combustor 4 via the first supply pipe 51. In the second type of third operation mode M3-2, a compression ratio of air supplied from the first compressor 21 to the combustor 4 is equal to a compression ratio of air supplied from the first compressor 21 to the combustor 4 in the first operation mode M1. Accordingly, the same output power as the output power of the first gas turbine unit 2 in the first operation mode M1 is acquired in the first gas turbine unit 2 in the second type of third operation mode M3-2.

The air discharged from the combustor 4 is supplied to the first turbine 22 via the first discharge pipe 54 and rotates the first turbine 22. Thereafter, the air is discharged from the first turbine 22 to the outside.

The operations and advantages of the gas turbine system 1 according to the second embodiment will be described below.

With the gas turbine system 1 according to this embodiment, the gas turbine system 1 includes two gas turbine units 2 and 3 and a single combustor 4 that is connected to the gas turbine units 2 and 3. Accordingly, it is possible to cause air compressed by a plurality of compressors 21 and 31 to flow to the single combustor 4. As a result, it is possible to increase an amount of air flowing to the combustor 4 and a flow rate of air and to obtain a high output power. The gas turbine system 1 includes pipes 5 (the first supply pipe 51, the second supply pipe 52, the compressor connection pipe 53, the first discharge pipe 54, the second discharge pipe 55, and the turbine connection pipe 56) that connect two compressors 21 and 31 and the combustor 4, connect the two compressors 21 and 31, connect two turbines 22 and 32 and the combustor 4, and connect the two turbines 22 and 32 and first to sixth on-off valves 6 that are provided in the pipes 5. It is possible to determine the pipes in which air can flow by controlling switching-on/off of desired on-off valves 6. Accordingly, one gas turbine unit of the two gas turbine units 2 and 3 can be connected to the combustor 4. As a result, even when one gas turbine unit (for example, the first gas turbine unit 2) is stopped, for example, at the time of occurrence of a defect or at the time of idling, it is possible to cause air to flow in only the gas turbine unit in operation (for example, the second gas turbine unit 3) and to stably operate the gas turbine unit 3 in operation.

Accordingly, with the gas turbine system 1 including the plurality of compressors 21 and 31 and the plurality of turbines 22 and 32, it is possible to provide a gas turbine system 1 that can stably supply a necessary amount of air to the combustor 4 even when a certain compressor 21 or 31 and a certain turbine 22 or 32 are stopped.

When the operation of the first gas turbine unit 2 in the third operation mode M3 is stopped, the control unit 7 opens the second on-off valve 62 and the fifth on-off valve 65 and closes the first on-off valve 61, the third on-off valve 63, the fourth on-off valve 64, and the sixth on-off valve 66. Accordingly, it is possible to operate the second gas turbine unit 3 while stopping the operation of the first gas turbine unit 2. At this time, since a flow of air between the first gas turbine unit 2 and the combustor 4 and a flow of air between the first gas turbine unit 2 and the second gas turbine unit 3 are cut off by the on-off valves 61, 63, 64, and 66, air flowing in the second gas turbine unit 3 does not flow to the first gas turbine unit 2. Accordingly, it is possible to supply a stable amount of air from the second gas turbine unit 3 to the combustor 4.

When the operation of the second gas turbine unit 3 in the third operation mode M3 is stopped, the control unit 7 opens the first on-off valve 61 and the fourth on-off valve 64 and closes the second on-off valve 62, the third on-off valve 63, the fifth on-off valve 65, and the sixth on-off valve 66. Accordingly, it is possible to operate the first gas turbine unit 2 while stopping the operation of the second gas turbine unit 3. At this time, since a flow of air between the second gas turbine unit 3 and the combustor 4 and a flow of air between the first gas turbine unit 2 and the second gas turbine unit 3 are cut off by the on-off valves 62, 63, 65, and 66, air flowing in the first gas turbine unit 2 does not flow to the second gas turbine unit 3. Accordingly, it is possible to supply a stable amount of air from the first gas turbine unit 2 to the combustor 4.

The first gas turbine unit 2 includes the first power generator 24 and the second gas turbine unit 3 includes the second power generator 34. The first power generator 24 is provided coaxially with the first compressor 21 and the first turbine 22 and the second power generator 34 is provided coaxially with the second compressor 31 and the second turbine 32. Accordingly, it is possible to generate electric power by driving the first power generator 24 through rotation of the first compressor 21 and the first turbine 22 of the first gas turbine unit 2. It is possible to generate electric power by driving the second power generator 34 through rotation of the second compressor 31 and the second turbine 32 of the second gas turbine unit 3. Accordingly, it is possible to effectively generate electric power using the power generator connected to the gas turbine unit in operation even when one gas turbine unit is stopped.

The control unit 7 can switch the operation mode between the first operation mode M1 and the second operation mode M2 in which both the first gas turbine unit 2 and the second gas turbine unit 3 operate and the third operation mode M3 in which one of the first gas turbine unit 2 and the second gas turbine unit 3 operates and the other stops its operation. The operation mode in which both the first gas turbine unit 2 and the second gas turbine unit 3 operate can switch between the first operation mode M1 in which an output power request is equal to or greater than the predetermined value X and the second operation mode M2 in which the output power request is less than the predetermined value X. In this way, since a plurality of operation modes can switch therebetween according to the magnitude of the output power request or the number of gas turbine units which are used, it is possible to improve efficiency of the gas turbine system 1 and safety at the time of occurrence of a defect.

In the third operation mode M3, an output power value (the third output power value) of one in operation of the first gas turbine unit 2 and the second gas turbine unit 3 is set to be equal to the first output power value in the first operation mode M1. Accordingly, even when one gas turbine unit of the two gas turbine units stops its operation, it is possible to secure an output power which is sufficiently high such that the operation is not hindered. As a result, it is possible to stably operate the gas turbine system 1.

Third Embodiment (Gas Turbine Power Generator)

A third embodiment of the invention will be described below with reference to FIGS. 9 and 10. In the following description, the same elements as in the first embodiment will be referred to by the same reference signs and description thereof will be appropriately omitted. The third embodiment is different from the first embodiment, in that an aircraft 10 includes a gas turbine power generator 301 instead of the gas turbine system 1 according to the first embodiment.

In this embodiment, the aircraft 10 (see FIG. 1) includes, for example, an airframe 11, a plurality of rotors 12A to 12D, a plurality of electric motors 14A to 14D, connection members 16A to 16D, and a gas turbine power generator 301.

Specifically, the aircraft 10 includes a hybrid propulsion system including a plurality of rotors which are driven with electric power generated by power generators 24 and 34 which will be described later.

Figure 9:
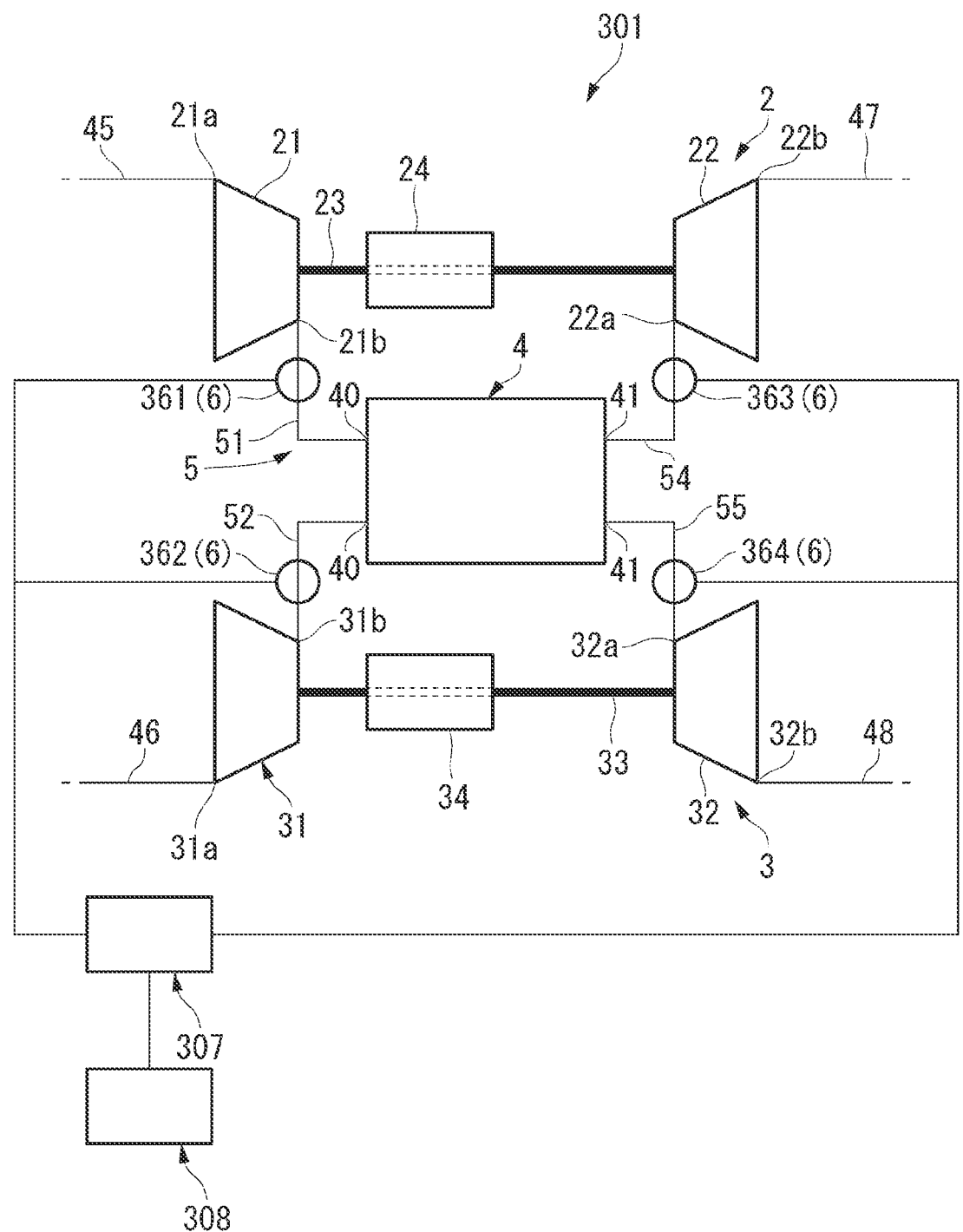
FIG. 9 is a diagram schematically showing a configuration of a gas turbine power generator according to a third embodiment.

FIG. 9 is a diagram schematically showing the configuration of the gas turbine power generator 301 according to the third embodiment. FIG. 9 is a diagram showing the operation of the gas turbine power generator in a first operation mode according to the third embodiment. The gas turbine power generator 301 is mounted in the aircraft 10. The gas turbine power generator 301 generates electric power serving as a drive source for driving the rotors 12A to 12D (see FIG. 1) of the aircraft 10. The gas turbine power generator 301 is constituted by a so-called gas turbine engine. The gas turbine power generator 301 includes a first gas turbine unit 2, a second gas turbine unit 3, a single combustor 4, a plurality of pipes 5, a plurality of on-off valves 6, an output control unit 307, and a flight state detecting unit 308.

(Gas Turbine Unit)

The configurations of the first gas turbine unit 2, the second gas turbine unit 3, and the combustor 4 according to the third embodiment are the same as the configurations of the first gas turbine unit 2, the second gas turbine unit 3, and the combustor 4 according to the first embodiment. That is, the first gas turbine unit 2 includes a first compressor 21, a first turbine 22, a first rotation shaft 23, and a first power generator 24. The second gas turbine unit 3 includes a second compressor 31, a second turbine 32, a second rotation shaft 33, and a second power generator 34.

The first power generator 24 is disposed between the first compressor 21 and the first turbine 22 in an axial direction of the first rotation shaft 23. More specifically, the first power generator 24 is disposed closer to the first compressor 21 than the first turbine 22 in the axial direction of the first rotation shaft 23.

The second power generator 34 is disposed between the second compressor 31 and the second turbine 32 in an axial direction of the second rotation shaft 33. More specifically, the second power generator 34 is disposed closer to the second compressor 31 than the second turbine 32 in the axial direction of the second rotation shaft 33.

(Combustor)

The combustor 4 is disposed between the first gas turbine unit 2 and the second gas turbine unit 3 in an arrangement direction of the first gas turbine unit 2 and the second gas turbine unit 3 (a lateral direction of the airframe 11).

(Pipes)

The plurality of pipes 5 include a first supply pipe 51, a second supply pipe 52, a first discharge pipe 54, a second discharge pipe 55, first and second outside air introduction pipes 45 and 46, and first and second exhaust gas discharge pipes 47 and 48. The first supply pipe 51 connects the outlet 21b of the first compressor 21 and the intake port 40 of the combustor 4. The first supply pipe 51 allows air compressed by the first compressor 21 to flow to the combustor 4. The second supply pipe 52 connects the outlet 31b of the second compressor 31 and the intake port 40 of the combustor 4. The second supply pipe 52 allows air compressed by the second compressor 31 to flow to the combustor 4. The first supply pipe 51 and the second supply pipe 52 are formed independent of each other without air therein is not mixed.

The first discharge pipe 54 connects the exhaust port 41 of the combustor 4 and the inlet 22a of the first turbine 22. The first discharge pipe 54 allows air discharged from the combustor 4 to flow to the first turbine 22. The second discharge pipe 55 connects the exhaust port 41 of the combustor 4 and the inlet 32a of the second turbine 32. The second discharge pipe 55 allows air discharged from the combustor 4 to flow to the second turbine 32. The first discharge pipe 54 and the second discharge pipe 55 are formed independently of each other such that air therein is not mixed.

(On-Off Valves)

The plurality of on-off valves 6 include a first on-off valve 361, a second on-off valve 362, a third on-off valve 363, a fourth on-off valve 364. The first on-off valve 361 is provided in the first supply pipe 51 and is configured to switch a flow of air in the first supply pipe 51 between permission and prohibition. The second on-off valve 362 is provided in the second supply pipe 52 and is configured to switch a flow of air in the second supply pipe 52 between permission and prohibition. The third on-off valve 363 is provided in the first discharge pipe 54 and is configured to switch a flow of air in the first discharge pipe 54 between permission and prohibition. The fourth on-off valve 364 is provided in the second discharge pipe 55 and is configured to switch a flow of air in the second discharge pipe 55 between permission and prohibition. The on-off valves are, for example, electromagnetic valves that are opened or closed by switching supply of electric power on/off.

(Output Control Unit)

The output control unit 307 controls on/off operations of the first on-off valve 361, the second on-off valve 362, the third on-off valve 363, and the fourth on-off valve 364. The output control unit 307 transmits a signal to the on-off valves 6, for example, using an electrical method. The plurality of on-off valves 6 can switch between an open state and a closed state in accordance with the received signal. The output control unit 307 identifies a predetermined operation mode of the aircraft 10 based on state information of the aircraft 10 or operation information from a pilot, and turns on/off the on-off valves in a predetermined combination according to the identified type of the operation mode.

Figure 10:
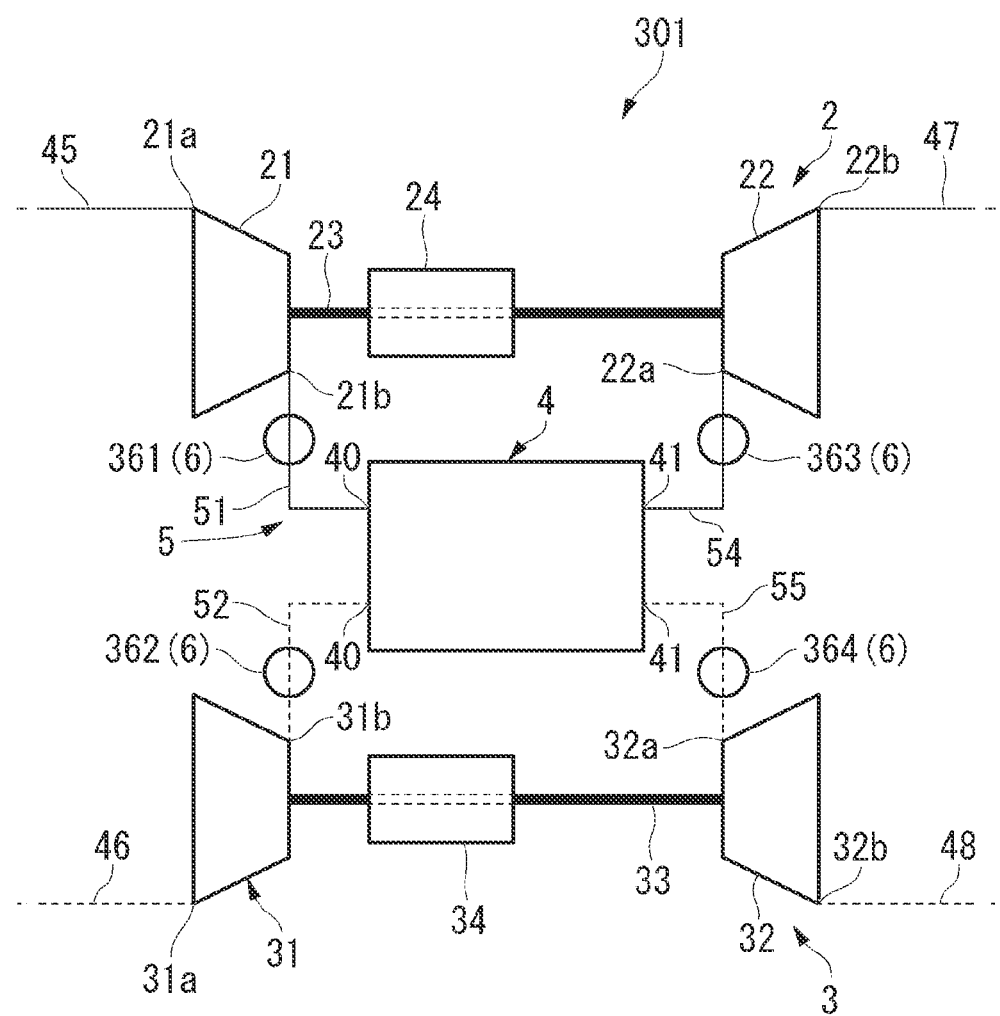
FIG. 10 is a diagram showing an operation of the gas turbine power generator in the second operation mode according to the third embodiment.

FIG. 10 is a diagram showing the operations of the gas turbine power generator 301 in a second operation mode according to this embodiment. In FIG. 10, the output control unit 307 and the flight state detecting unit 308 are not shown.

As shown in FIGS. 9 and 10, the output control unit 307 can identify at least two operation modes including a first operation mode M301 (see FIG. 9) and a second operation mode M302 (see FIG. 10).

The first operation mode M301 according to this embodiment is an operation mode corresponding to the first operation mode M1 according to the first embodiment (see FIG. 5). The second operation mode M302 is an operation mode corresponding to the second operation mode M2 according to the first embodiment (see FIG. 5).

The output control unit 307 that controls the on/off operations of the plurality of on-off valves 6 transitions to the first operation mode M301 when the aircraft 10 is in the takeoff/landing state. The output control unit 307 transitions to the second operation mode M302 when the aircraft 10 is in the cruising state. In other words, the first operation mode M301 is an operation mode which is used when the aircraft 10 takes off or lands, and the second operation mode M302 is an operation mode which is used when the aircraft 10 cruises. The first operation mode M301 is an operation mode which is set when the required output power of the first gas turbine unit 2 and the second gas turbine unit 3 is equal to or greater than a predetermined value X. The second operation mode M302 is an operation mode which is set when the required output power is less than the predetermined value X.

The flight state detecting unit 308 detects a flight state of the aircraft 10. For example, the flight state detecting unit 308 detects whether the aircraft 10 is in the takeoff/landing state or whether the aircraft 10 is in the cruising state. The result of detection from the flight state detecting unit 308 is transmitted to the output control unit 307. The output control unit 307 controls an engine output power based on the flight state of the aircraft 10 detected by the flight state detecting unit 308. That is, the output control unit 307 switches the operation mode to the first operation mode M301 when the result of detection indicating that the aircraft 10 is in the takeoff/landing state is received from the flight state detecting unit 308. The output control unit 307 switches the operation mode to the second operation mode M302 when the result of detection indicating that the aircraft 10 is in the cruising state is received from the flight state detecting unit 308.

(Operations of Gas Turbine Power Generator in Operation Modes)

The operations of the gas turbine power generator 301 in the operation modes will be described below. The operation of the gas turbine power generator 301 in the first operation mode M301 will be described first.

As shown in FIG. 9, in the first operation mode M301, the output control unit 307 opens the first on-off valve 361, the second on-off valve 362, the third on-off valve 363, and the fourth on-off valve 364. That is, the first on-off valve 361 permits a flow of air from the first compressor 21 to the combustor 4. The second on-off valve 362 permits a flow of air from the second compressor 31 to the combustor 4. The third on-off valve 363 permits a flow of air from the combustor 4 to the first turbine 22. The fourth on-off valve 364 permits a flow of air from the combustor 4 to the second turbine 32.

The first compressor 21 takes in and compresses outside air. The air compressed by the first compressor 21 flows to the combustor 4 via the first supply pipe 51. The second compressor 31 takes in and compresses outside air. The air compressed by the second compressor 31 flows to the combustor 4 via the second supply pipe 52. Accordingly, since compressed air flows to the combustor 4 from the first compressor 21 and the second compressor 31, the combustor 4 is supplied with an amount of air sufficient for generating an output power required for the combustor 4.

About a half of air discharged from the combustor 4 is supplied to the first turbine 22 via the first discharge pipe 54 and rotates the first turbine 22. Thereafter, air is discharged from the first turbine 22 to the outside. The other half of air discharged from the combustor 4 is supplied to the second turbine 32 via the second discharge pipe 55 and rotates the second turbine 32. Thereafter, air is discharged from the second turbine 32 to the outside. When the first turbine 22 and the second turbine 32 rotate, the first power generator 24 and the second power generator 34 are rotationally driven and generate electric power.

The operation of the gas turbine power generator 301 in the second operation mode M302 will be described below.

As shown in FIG. 10, in the second operation mode M302, the output control unit 307 stops the operation of one of the first gas turbine unit 2 and the second gas turbine unit 3 and closes the on-off valves 6 which are provided in the supply pipe (the first supply pipe 51 or the second supply pipe 52) and the discharge pipe (the first discharge pipe 54 or the second discharge pipe 55) which are connected to the stopped gas turbine unit. In the example shown in FIG. 10, it is assumed that the operation of the second gas turbine unit 3 is stopped. Specifically, in the example shown in FIG. 10, the output control unit 307 opens the first on-off valve 361 and the third on-off valve 363 and closes the second on-off valve 362 and the fourth on-off valve 364. That is, the first on-off valve 361 permits a flow of air from the first compressor 21 to the combustor 4. The second on-off valve 362 cuts off a flow of air from the second compressor 31 to the combustor 4. The third on-off valve 363 permits a flow of air from the combustor 4 to the first turbine 22. The fourth on-off valve 364 cuts off a flow of air from the combustor 4 to the second turbine 32. Accordingly, the output control unit 307 stops the operation of the second gas turbine unit 3 and activates the first gas turbine unit 2. The output control unit 307 may perform on/off control of the on-off valves 6 after rotation of the second gas turbine unit 3 has been completely stopped.

The first compressor 21 takes in and compresses outside air. The air compressed by the first compressor 21 flows to the combustor 4 via the first supply pipe 51. In the second operation mode M302, the compression ratio of air supplied from the first compressor 21 to the combustor 4 is equal to the compression ratio of air supplied from the first compressor 21 to the combustor 4 in the first operation mode M301. Accordingly, the same output power as the output power of the first gas turbine unit 2 in the first operation mode M301 is acquired in the first gas turbine unit 2 in the second operation mode M302. In this embodiment, rated output powers of the first gas turbine unit 2 and the second gas turbine unit 3 are equal to each other. Accordingly, in the second operation mode M302, about a half of the output power of the gas turbine power generator 301 in the first operation mode M301 is acquired in the gas turbine power generator 301 as a whole.

Air discharged from the combustor 4 is supplied to the first turbine 22 via the first discharge pipe 54 and rotates the first turbine 22. Thereafter, the air is discharged from the first turbine 22 to the outside.

The operations and advantages of the gas turbine power generator 301 will be described below.

With the gas turbine power generator 301 according to this embodiment, the gas turbine power generator 301 includes the first gas turbine unit 2, the second gas turbine unit 3, and the single combustor 4. Since the plurality of gas turbine units 2 and 3 are connected to the single combustor 4, it is possible to decrease the number of components in comparison with that in the related art in which a plurality of combustors are provided to correspond to a plurality of gas turbine units 2 and 3. Accordingly, it is possible to curb an increase in weight or cost of the gas turbine power generator 301 as a whole. With a decrease in weight of the gas turbine power generator 301, it is possible to improve fuel efficiency without decreasing an output power in comparison with that in the related art.

The first power generator 24 is provided between the first compressor 21 and the first turbine 22 in the axial direction of the first rotation shaft 23. The second power generator 34 is provided between the second compressor 31 and the second turbine 32 in the axial direction of the second rotation shaft 33. In this way, by providing each power generator 24 or 34 between the corresponding compressor 21 or 31 and the corresponding turbine 22 or 32, it is possible to effectively use a space between the compressor 21 or 31 and the turbine 22 or 32 in the axial direction and to decrease an axial length of the corresponding gas turbine unit 2 or 3 as a whole. Accordingly, it is possible to decrease the size of the gas turbine power generator 301 and to improve a degree of freedom in layout at the time of mounting the gas turbine power generator in the airframe 11. It is also possible to decrease the weight of the gas turbine power generator 301 through the decrease in size.

Accordingly, it is possible to provide a gas turbine power generator 301 with improved fuel efficiency while curbing an increase in cost or weight in comparison with that in the related art.

The first power generator 24 is provided coaxially with the first rotation shaft 23 and the second power generator 34 is provided coaxially with the second rotation shaft 33. Accordingly, it is possible to efficiently transmit a rotational force generated by the compressors 21 and 31 and the turbines 22 and 32 to the corresponding power generators 24 and 34. As a result, it is possible to enhance power generation efficiency of the gas turbine power generator 301.

The output control unit 307 switches the output power mode of the aircraft 10 between the first operation mode M301 and the second operation mode M302 based on the flight state detected by the flight state detecting unit 308. In the second operation mode M302, the output control unit 307 stops the operation of one of the first gas turbine unit 2 and the second gas turbine unit 3 and cuts off a flow of air in the supply pipes and the discharge pipes connected to the stopped gas turbine unit. Accordingly, for example, in a low-load state such as cruising of the aircraft 10, it is possible to curb generation of excessive electric power by switching the operation mode to the second operation mode M302. On the other hand, in a high-load state such as takeoff/landing of the aircraft 10, it is possible to secure a high output power by switching the operation mode to the first operation mode M301. Accordingly, it is possible to provide a gas turbine power generator 301 that can achieve further improvement in fuel efficiency when it is applied to an aircraft 10 in which an output power value varies greatly between the low-load state and the high-load state.

The first power generator 24 is disposed close to the first compressor 21 than the first turbine 22, and the second power generator 34 is disposed closer to the second compressor 31 than the second turbine 32. Accordingly, since the power generators can be disposed closer to the compressors 21 and 31 in which the temperature is lower than that of the turbines 22 and 32, it is possible to protect the power generators 24 and 34 from heat. As a result, even when the power generators 24 and 34 are disposed between the compressors 21 and 31 and the turbines 22 and 32 to decrease the axial length, it is possible to curb a decrease in output performance of the power generators 24 and 34 due to a high temperature.

The combustor 4 is disposed between the first gas turbine unit 2 and the second gas turbine unit 3. Accordingly, it is possible to decrease lengths of a plurality of pipes 5 for connection between the combustor 4 and the gas turbine units 2 and 3. As a result, it is possible to curb an increase in weight of the pipes 5.

The technical scope of the invention is not limited to the aforementioned embodiments and the invention can be modified in various forms without departing from the gist of the invention.

For example, in the first embodiment, the upstream end of the compressor connection pipe 53 is connected to the supply pipe mid-portion 57 of the first supply pipe 51, but the upstream end of the compressor connection pipe 53 may be connected to the outlet 21*b* of the first compressor 21. By connecting the compressor connection pipe 53 to the supply pipe mid-portion 57 of the first supply pipe 51, the compressor connection pipe 53 and the first supply pipe 51 can be formed integrally and thus an increase in the number of components or an increase in weight can be curbed, which is an advantage of the embodiment.

The control unit 7 may include an operation mode other than the first operation mode M1, the second operation mode M2, and the third operation mode M3. In the first operation mode M1 according to the aforementioned embodiment, the combustor 4 and the compressors 21 and 31 are connected in parallel on the intake side of the combustor 4, and the combustor 4 and the turbines 22 and 32 are connected in parallel on the exhaust side of the combustor 4. In the second operation mode M2 according to the aforementioned embodiment, the combustor 4 and the compressors 21 and 31 are connected in series on the intake side of the combustor 4, and the combustor 4 and the turbines 22 and 32 are connected in series on the exhaust side of the combustor 4. For example, in another operation mode, the combustor 4 and the compressors 21 and 31 may be connected in parallel on the intake side of the combustor 4, and the combustor 4 and the turbines 22 and 32 may be connected in series on the exhaust side of the combustor 4. The combustor 4 and the compressors 21 and 31 may be connected in series on the intake side of the combustor 4, and the combustor 4 and the turbines 22 and 32 may be connected in parallel on the exhaust side of the combustor 4.

In the first embodiment and the second embodiment, the first on-off valve 61 and the third on-off valve 63 may be independent components. In view of curbing an increase in the number of components and an increase in weight and cost, the configuration of the embodiment in which the first on-off valve 61 and the third on-off valve 63 are formed as a single three-way valve 42 is advantageous.

Similarly, the fourth on-off valve 64 and the sixth on-off valve 66 may be independent components. In view of curbing an increase in the number of components and an increase in weight and cost, the configuration of the embodiment in which the fourth on-off valve 64 and the sixth on-off valve 66 are formed as a single three-way valve 43 is advantageous.

For example, in the third embodiment and FIG. 10, the operation of the second gas turbine unit 3 is stopped in the second operation mode M302, but the invention is not limited thereto. In the second operation mode M302, the operation of the first gas turbine unit 2 may be stopped and the second gas turbine unit 3 may be activated. In this case, the output control unit 307 closes the first on-off valve 361 and the third on-off valve 363 and opens the second on-off valve 362 and the fourth on-off valve 364.

The number of rotors 12 and the number of electric motors 14 in the aircraft 10 are not limited to the aforementioned embodiments.

The gas turbine power generator 301 may include three or more gas turbine units.

The elements of the aforementioned embodiments can be appropriately replaced with known elements without departing from the gist of the invention, and the aforementioned embodiments may be appropriately combined.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Gas turbine system
2 First gas turbine unit
3 Second gas turbine unit
4 Combustor
6 On-off valve
7 Control unit
10 Aircraft
11 Airframe
12 Rotor
21 First compressor
21b Outlet (of first compressor)
22 First turbine
22a Inlet (of first turbine)
23 First rotation shaft
24 First power generator
31 Second compressor
31a Inlet (of second compressor)
32 Second turbine
32b Outlet (of second turbine)
33 Second rotation shaft
34 Second power generator
40 Intake port
42 Three-way valve (on intake side)
43 Three-way valve (on exhaust side)
51 First supply pipe
52 Second supply pipe
53 Compressor connection pipe
54 First discharge pipe
55 Second discharge pipe
56 Turbine connection pipe
57 Supply pipe mid-portion
58 Discharge pipe mid-portion
61, 361 First on-off valve
62, 362 Second on-off valve
63, 363 Third on-off valve
64, 364 Fourth on-off valve
65 Fifth on-off valve
66 Sixth on-off valve
301 Gas turbine power generator
307 Output control unit
308 Flight state detecting unit
M1, M301 First operation mode
M2, M302 Second operation mode
M3 Third operation mode
X Predetermined value

What is claimed is:

1. A gas turbine system comprising:
a first gas turbine unit including a first compressor and a first turbine that rotates integrally with the first compressor;
a second gas turbine unit including a second compressor and a second turbine that rotates integrally with the second compressor;
a single combustor that is connected to the first gas turbine unit and the second gas turbine unit;
a first supply pipe that connects the first compressor to the combustor and allows air compressed by the first compressor to flow to an intake port of the combustor;
a second supply pipe that connects the second compressor to the combustor and allows air compressed by the second compressor to flow to the intake port of the combustor;
a compressor connection pipe that connects an outlet of the first compressor to an inlet of the second compressor;
a first on-off valve that is provided in the first supply pipe and is able to cut off a flow of air in the first supply pipe;
a second on-off valve that is provided upstream in a flow direction of air from the inlet of the second compressor and is able to cut off a flow of air to the second compressor;
a third on-off valve that is provided in the compressor connection pipe and is able to cut off a flow of air in the compressor connection pipe; and
an engine controller configured to control switching-on/off of the first on-off valve, the second on-off valve, and the third on-off valve,
wherein the engine controller is configured to switch an operation mode between a first operation mode which is set when required output power for the first gas turbine unit and the second gas turbine unit is equal to or greater than a predetermined value and a second operation mode which is set when the required output power is less than the predetermined value,
wherein the engine controller opens the first on-off valve and the second on-off valve and closes the third on-off valve in the first operation mode, and
wherein the engine controller closes the first on-off valve and the second on-off valve and opens the third on-off valve in the second operation mode.

2. The gas turbine system according to claim 1, wherein the gas turbine system is mounted in an aircraft,
wherein the first operation mode is an operation mode which is used at the time of takeoff or landing of the aircraft,
wherein the second operation mode is an operation mode which is used at the time of cruising of the aircraft,
wherein the combustor is supplied with compressed air from the first compressor and the second compressor in the first operation mode, and
wherein the combustor is supplied with compressed air which has a higher pressure than the compressed air in the first operation mode by compressing air in stages while sequentially passing the air through the first compressor and the second compressor in the second operation mode.

3. The gas turbine system according to claim 1, wherein the compressor connection pipe is connected to a supply pipe mid-portion of the first supply pipe between the first compressor and the combustor and is formed integrally with the first supply pipe to communicate with the first supply pipe, and
wherein the first on-off valve and the third on-off valve are a three-way valve which is provided in the supply pipe mid-portion.

4. The gas turbine system according to claim 1, further comprising:
a first discharge pipe that connects the combustor to the first turbine and allows air discharged from the combustor to flow to the first turbine;
a second discharge pipe that connects the combustor to the second turbine and allows air discharged from the combustor to flow to the second turbine;
a turbine connection pipe that connects an inlet of the first turbine to an outlet of the second turbine;

a fourth on-off valve that is provided in the first discharge pipe and is able to cut off a flow of air in the first discharge pipe;
a fifth on-off valve that is provided downstream in a flow direction of air from the outlet of the second turbine and is able to cut off a flow of air from the second turbine to the outside; and
a sixth on-off valve that is provided in the turbine connection pipe and is able to cut off a flow of air in the turbine connection pipe,
wherein the control unit controls switching-on/off of the fourth on-off valve, the fifth on-off valve, and the sixth on-off valve,
wherein the control unit opens the fourth on-off valve and the fifth on-off valve and closes the sixth on-off valve in the first operation mode, and
wherein the control unit closes the fourth on-off valve and the fifth on-off valve and opens the sixth on-off valve in the second operation mode.

5. The gas turbine system according to claim 4, wherein the turbine connection pipe is connected to a discharge pipe mid-portion of the first discharge pipe between the first turbine and the combustor and is formed integrally with the first discharge pipe to communicate with the first discharge pipe, and
wherein the fourth on-off valve and the sixth on-off valve are a three-way valve which is provided in the discharge pipe mid-portion.

6. The gas turbine system according to claim 1, wherein the first gas turbine unit includes
a first rotation shaft that connects the first compressor to the first turbine, and
a first power generator that is provided coaxially with the first rotation shaft between the first compressor and the first turbine, and
wherein the second gas turbine unit includes
a second rotation shaft that connects the second compressor to the second turbine, and
a second power generator that is provided coaxially with the second rotation shaft between the second compressor and the second turbine.

7. A gas turbine system comprising:
a first gas turbine unit including a first compressor and a first turbine that rotates integrally with the first compressor;
a second gas turbine unit including a second compressor and a second turbine that rotates integrally with the second compressor;
a single combustor that is connected to the first gas turbine unit and the second gas turbine unit;
a first supply pipe that connects the first compressor to the combustor and allows air compressed by the first compressor to flow to an intake port of the combustor;
a second supply pipe that connects the second compressor to the combustor and allows air compressed by the second compressor to flow to the intake port of the combustor;
a compressor connection pipe that connects an outlet of the first compressor to an inlet of the second compressor;
a first discharge pipe that connects the combustor to the first turbine and allows air discharged from the combustor to flow to the first turbine;
a second discharge pipe that connects the combustor to the second turbine and allows air discharged from the combustor to flow to the second turbine;
a turbine connection pipe that connects an inlet of the first turbine to an outlet of the second turbine;
a first on-off valve that is provided in the first supply pipe and is able to cut off a flow of air in the first supply pipe;
a second on-off valve that is provided upstream in a flow direction of air from the inlet of the second compressor and is able to cut off a flow of air to the second compressor;
a third on-off valve that is provided in the compressor connection pipe and is able to cut off a flow of air in the compressor connection pipe;
a fourth on-off valve that is provided in the first discharge pipe and is able to cut off a flow of air in the first discharge pipe;
a fifth on-off valve that is provided downstream in a flow direction of air from the outlet of the second turbine and is able to cut off a flow of air from the second turbine to the outside;
a sixth on-off valve that is provided in the turbine connection pipe and is able to cut off a flow of air in the turbine connection pipe; and
a control unit configured to control switching-on/off of the first on-off valve, the second on-off valve, the third on-off valve, the fourth on-off valve, the fifth on-off valve, and the sixth on-off valve.

8. The gas turbine system according to claim 7, wherein the control unit stops an operation of the first gas turbine unit and operates the second gas turbine unit by opening the second on-off valve and the fifth on-off valve and closing the first on-off valve, the third on-off valve, the fourth on-off valve, and the sixth on-off valve.

9. The gas turbine system according to claim 7, wherein the control unit operates the first gas turbine unit and stops an operation of the second gas turbine unit by opening the first on-off valve and the fourth on-off valve and closing the second on-off valve, the third on-off valve, the fifth on-off valve, and the sixth on-off valve.

10. The gas turbine system according to claim 7, wherein the first gas turbine unit includes
a first rotation shaft that connects the first compressor to the first turbine, and
a first power generator that is provided coaxially with the first rotation shaft between the first compressor and the first turbine, and
wherein the second gas turbine unit includes
a second rotation shaft that connects the second compressor to the second turbine, and
a second power generator that is provided coaxially with the second rotation shaft between the second compressor and the second turbine.

11. The gas turbine system according to claim 7, wherein the control unit is able to switch an operation mode to:
a first operation mode which is an operation mode in which both the first gas turbine unit and the second gas turbine unit operate and which is set when an output request for the first gas turbine unit and the second gas turbine unit is equal to or greater than a predetermined value;
a second operation mode which is an operation mode in which both the first gas turbine unit and the second gas turbine unit operate and which is set when the output request is less than the predetermined value; or
a third operation mode in which one of the first gas turbine unit and the second gas turbine unit operates and the other stops its operation, wherein output power values of the first gas turbine unit and the second gas turbine unit in the first operation mode are a first output power value, wherein a sum of the output power values of the first gas turbine unit and the second gas turbine unit in the second operation mode is a second output power value, wherein an output power value of an operating one of the first gas turbine unit and the second gas turbine unit in the third operation mode is a third output power value, and wherein the third output power value is equal to the first output power value.

12. A gas turbine power generation system that is mounted in an airframe of an aircraft with a hybrid propulsion system including a plurality of rotors which are connected to a power generator and which are driven with electric power generated by the power generator, the gas turbine power generation system comprising:

a first gas turbine unit including a first compressor and a first turbine that is connected to the first compressor via a first rotation shaft and rotates integrally with the first compressor;

a second gas turbine unit including a second compressor and a second turbine that is connected to the second compressor via a second rotation shaft and rotates integrally with the second compressor;

a single combustor that is connected to the first gas turbine unit and the second gas turbine unit;

a first supply pipe that connects the first compressor to the combustor and allows air compressed by the first compressor to flow to an intake port of the combustor;

a second supply pipe that connects the second compressor to the combustor and allows air compressed by the second compressor to flow to the intake port of the combustor;

a first discharge pipe that connects the combustor to the first turbine and allows air discharged from the combustor to flow to the first turbine;

a second discharge pipe that connects the combustor to the second turbine and allows air discharged from the combustor to flow to the second turbine;

a plurality of on-off valves; and an engine controller configured to control switching-on/off of the plurality of on-off valves and to control engine output power based on a flight state of the aircraft, wherein the first gas turbine unit includes a first power generator that is connected to the first rotation shaft and is provided between the first compressor and the first turbine in an axial direction of the first rotation shaft, and wherein the second gas turbine unit includes a second power generator that is connected to the second rotation shaft and is provided between the second compressor and the second turbine in an axial direction of the second rotation shaft;

wherein the plurality of on-off valves include:

a first on-off valve that is provided in the first supply pipe and is able to cut off a flow of air in the first supply pipe;

a second on-off valve that is provided in the second supply pipe and is able to cut off a flow of air in the second supply pipe;

a third on-off valve that is provided in the first discharge pipe and is able to cut off a flow of air in the first discharge pipe; and a fourth on-off valve that is provided in the second discharge pipe and is able to cut off a flow of air in the second discharge pipe;

wherein the engine controller is able to switch an output power mode of the aircraft between a first operation mode and a second operation mode in which an output power value is less than an output power value in the first operation mode based on the flight state, and wherein the engine controller stops an operation of one of the first gas turbine unit and the second gas turbine unit and closes the on-off valves provided in the supply pipe and the discharge pipe connected to the one gas turbine unit in the second operation mode.

13. The gas turbine power generation system according to claim 12, wherein the first power generator is provided coaxially with the first rotation shaft, and wherein the second power generator is provided coaxially with the second rotation shaft.

14. The gas turbine power generation system according to claim 12, wherein the first power generator is disposed closer to the first compressor than the first turbine in the axial direction of the first rotation shaft, and wherein the second power generator is disposed closer to the second compressor than the second turbine in the axial direction of the second rotation shaft.

15. The gas turbine power generation system according to claim 12, wherein the combustor is disposed between the first gas turbine unit and the second gas turbine unit in an arrangement direction of the first gas turbine unit and the second gas turbine unit.

16. The gas turbine power generation system according to claim 12, further comprising a flight state detecting unit.

* * * * *